United States Patent [19]
Nedoh

[11] 3,876,353
[45] Apr. 8, 1975

[54] MOLD ASSEMBLY FOR APPLYING A DECORATIVE FACING TO AN ARTICLE

[76] Inventor: Andrew R. Nedoh, 4262 Hametown Rd., Norton, Ohio 44203

[22] Filed: Jan. 7, 1974

[21] Appl. No.: 431,120

Related U.S. Application Data

[62] Division of Ser. No. 242,938, April 11, 1972, Pat. No. 3,799,717.

[52] U.S. Cl. .................................. 425/90; 249/83
[51] Int. Cl. ............................................. B28b 3/10
[58] Field of Search ............... 425/60, 90, 95–95, 425/105–106, 112, 125, 128, 253, 340, 360, 383, 385, 452; 214/256, 133, 259; 249/90, 120, 127, 134, 137–139

[56] References Cited
UNITED STATES PATENTS

| | | | |
|---|---|---|---|
| 2,197,212 | 4/1940 | Hagemeyer | 249/139 |
| 3,431,601 | 3/1969 | Lipscomb | 249/120 |

*Primary Examiner*—Robert D. Baldwin
*Assistant Examiner*—John McQuade
*Attorney, Agent, or Firm*—Hamilton, Renner & Kenner

[57] ABSTRACT

Disclosed is a method and apparatus for automatically applying, attaching, curing and processing a decorative facing to an article such as a conventional building or other blocks, brick, tile or other kinds of building materials. A plurality of blocks or building materials to receive the facing are transferred to a loading station on an intake block feeder designed to present the blocks in pairs to transfer device or arm which loads the pair of blocks onto a plurality of movable pallets. These pallets are intermittently driven in a carrousel-type arrangement through a plurality of work stations. First the blocks are properly centered on the pallet to receive a mold plate which carries two molds that are filled at another station with an uncured plastic compound. Means are provided to transfer the filled molds to the block and each mold is designed to be self-locking on the pair of blocks. The block and mold combination is thereafter transferred through a unique oven arrangement which systematically cures the plastic material to form the decorative facing on the block. As the blocks continue their intermittent transfer through the system and come out of the oven, the molds are automatically removed and positioned at a filling station for subsequent re-use. The same transfer device which loads the blocks onto the pallets simultaneously, while performing the loading function on another pair of blocks, then unloads the finished blocks onto a take-away conveyor. Other features are disclosed which make the system totally automated, such as a means which makes the system universally adaptable to various sized blocks or other items to which a decorative plastic facing may be applied.

5 Claims, 57 Drawing Figures

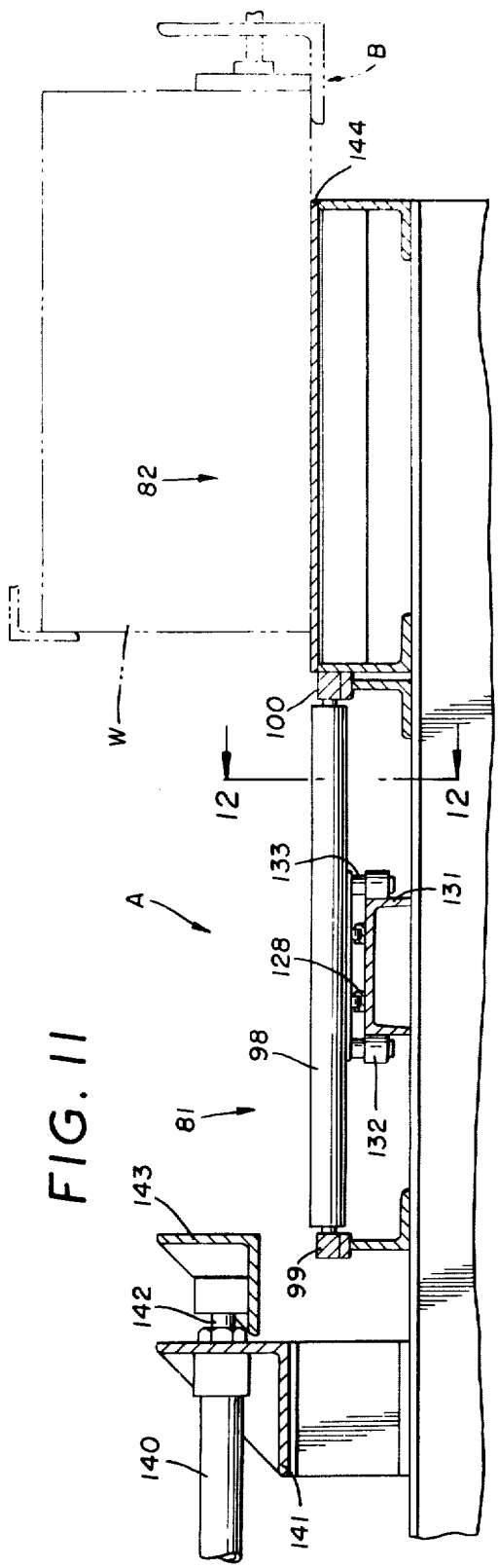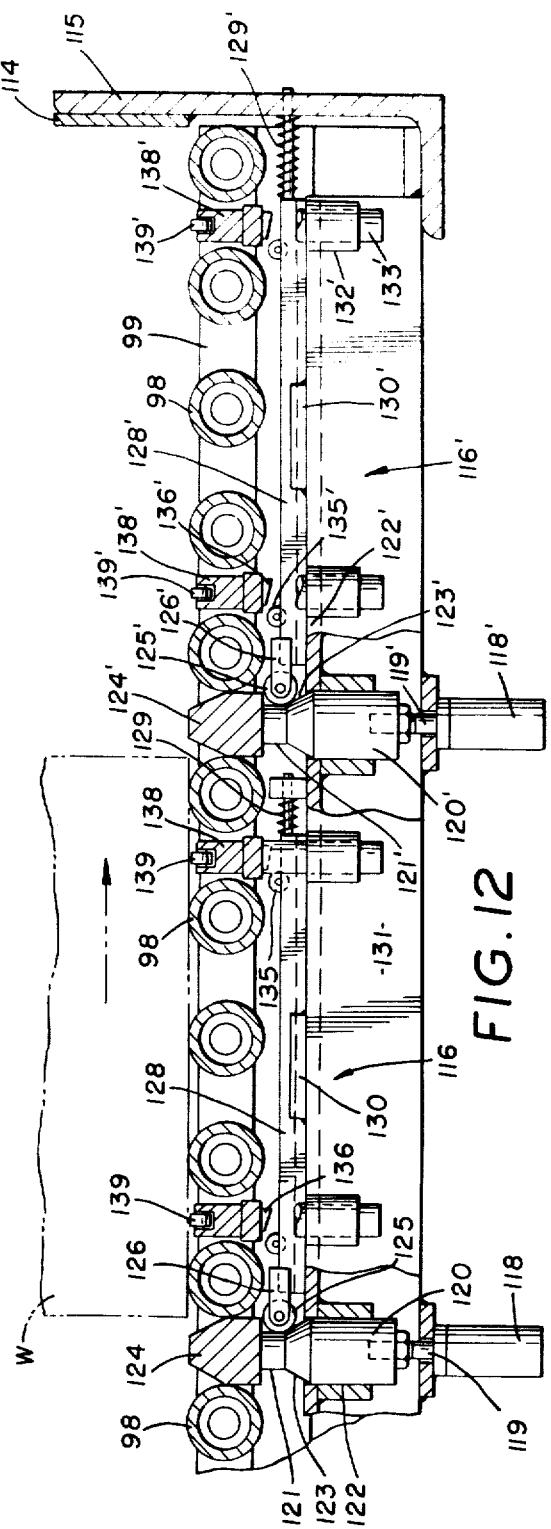

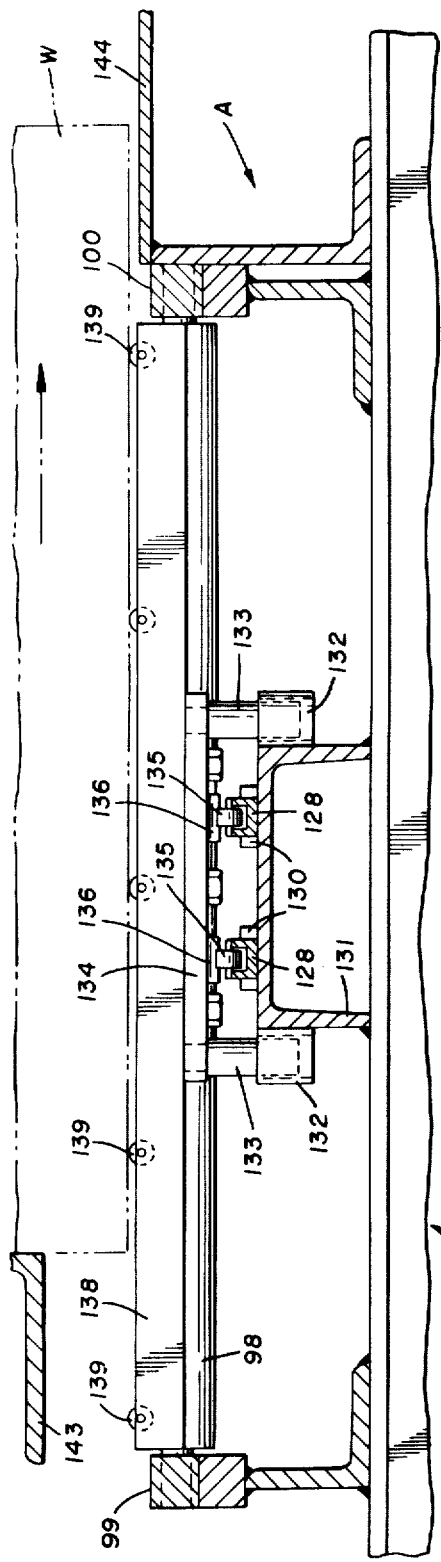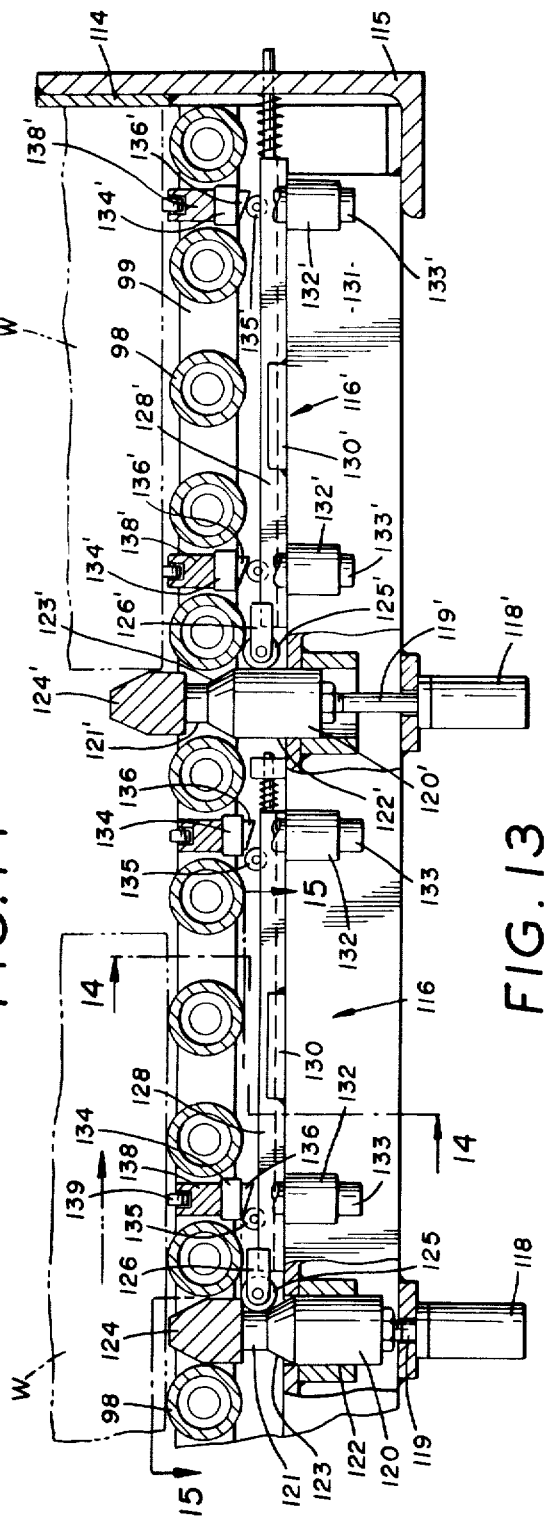
FIG. 14
FIG. 13

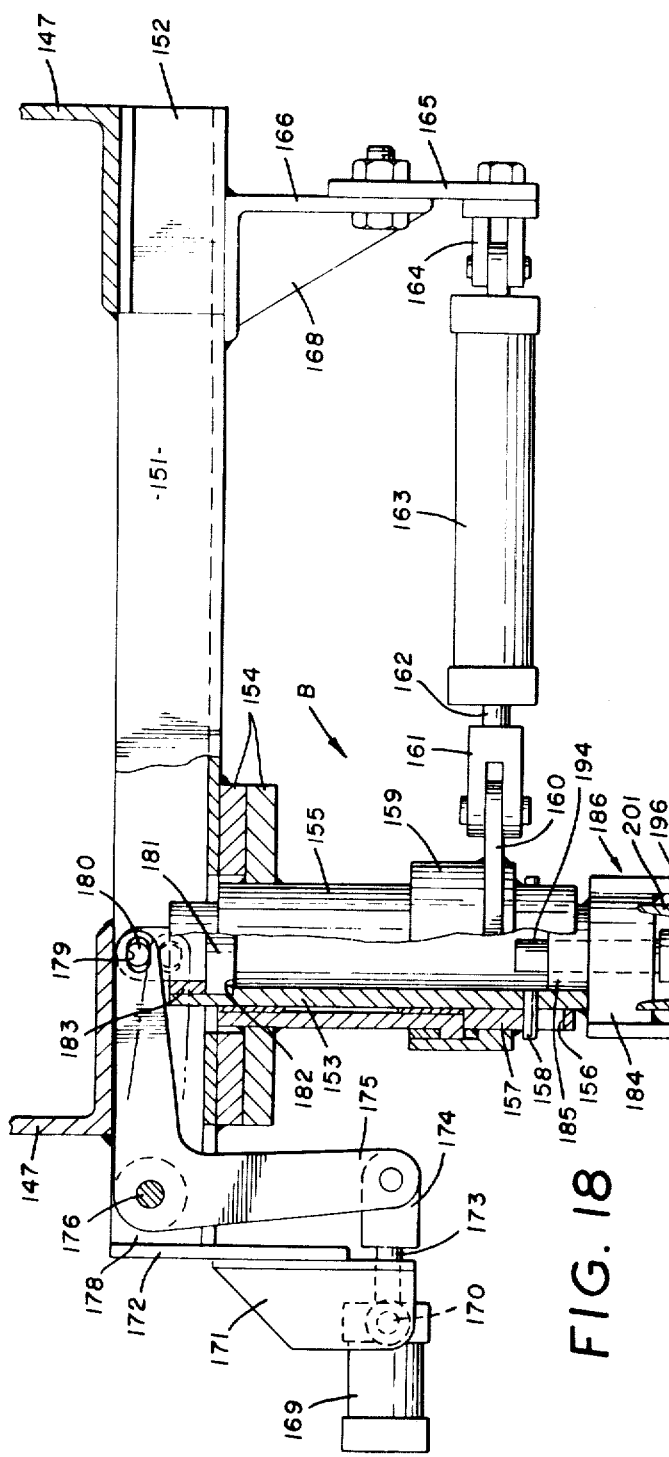
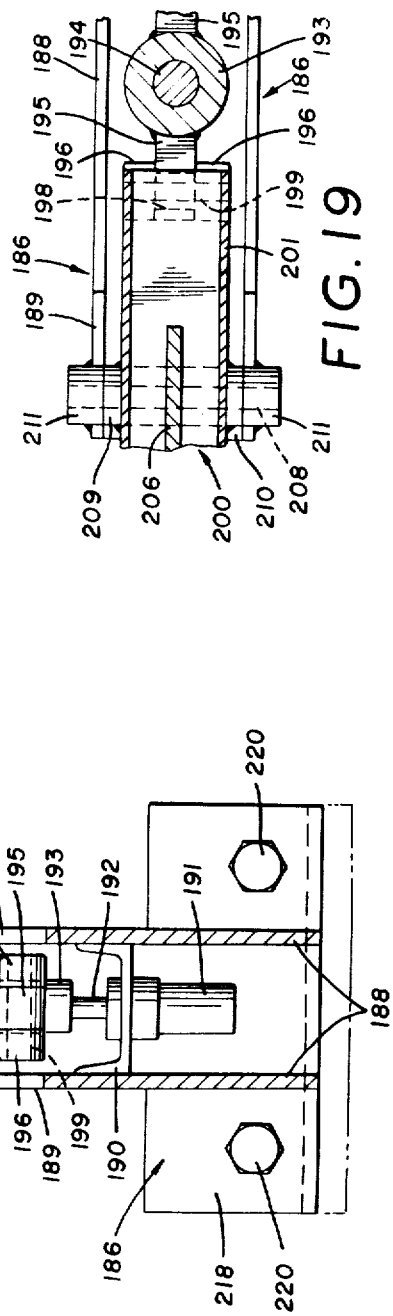
FIG. 18
FIG. 19

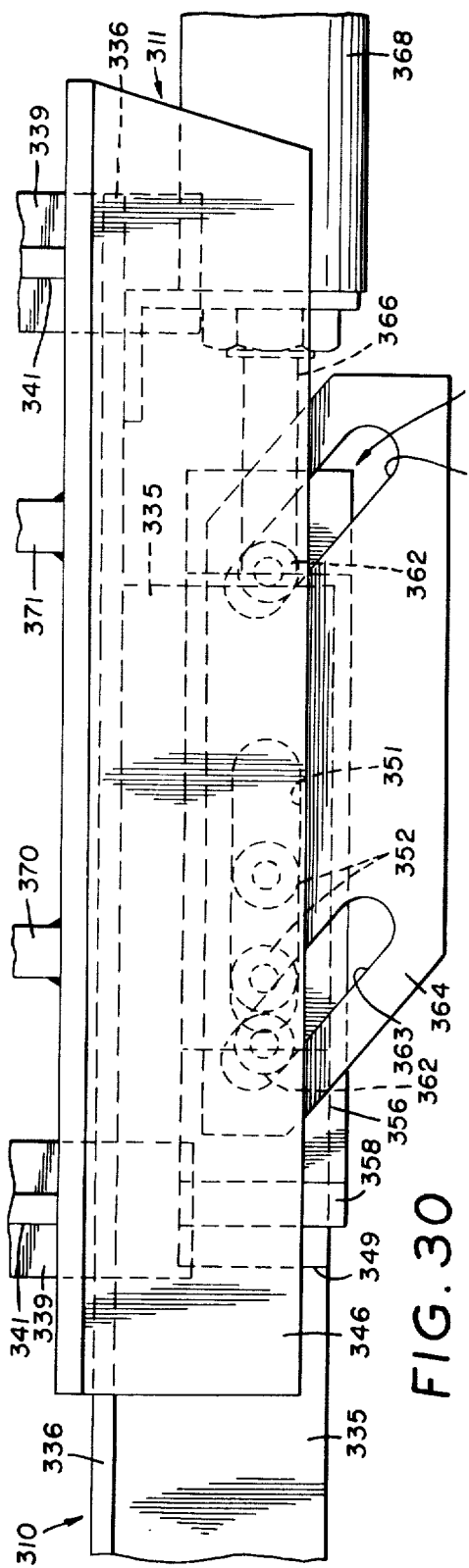
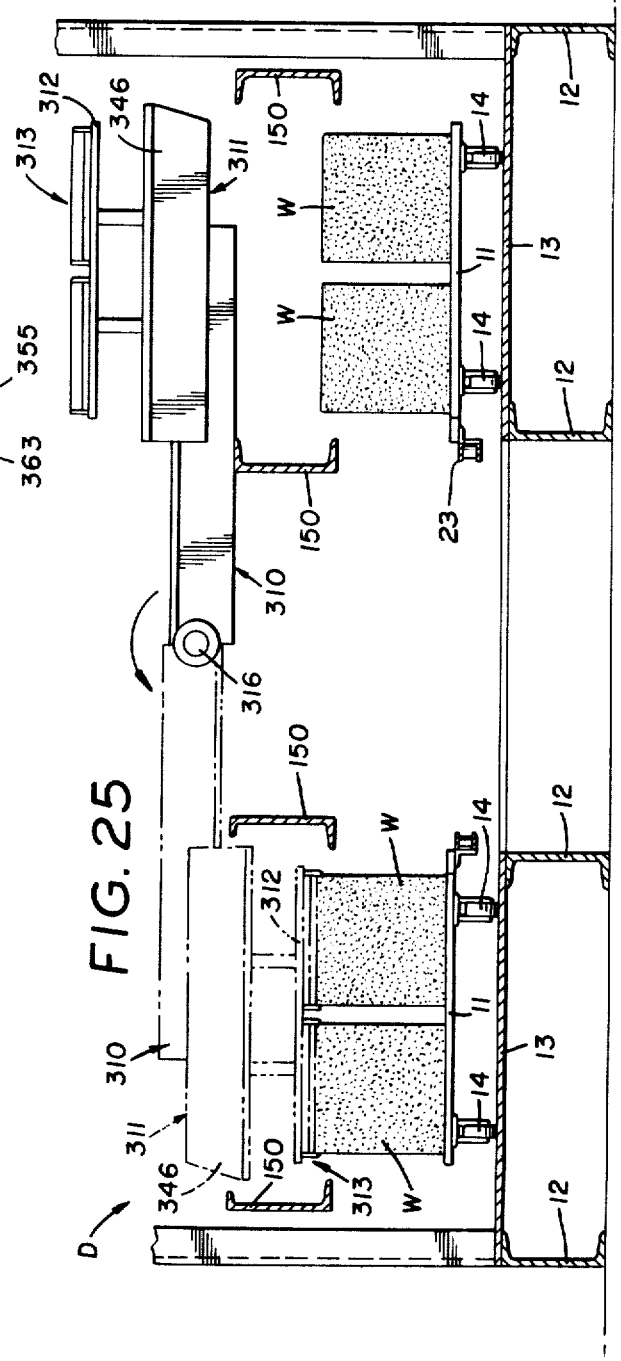

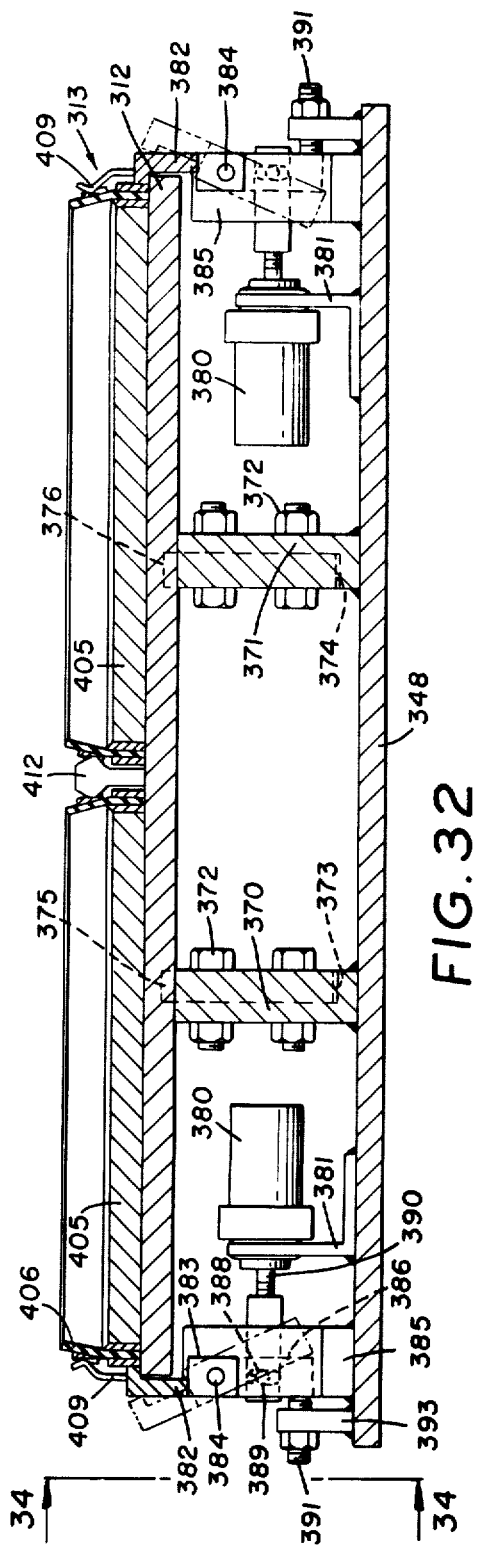
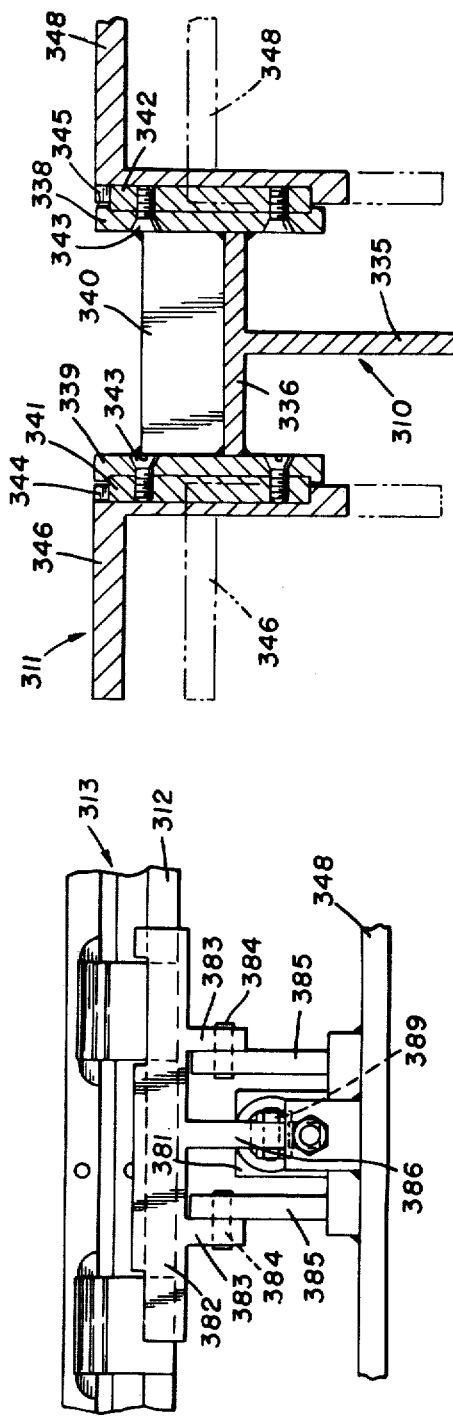
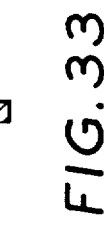
FIG. 32
FIG. 33
FIG. 34

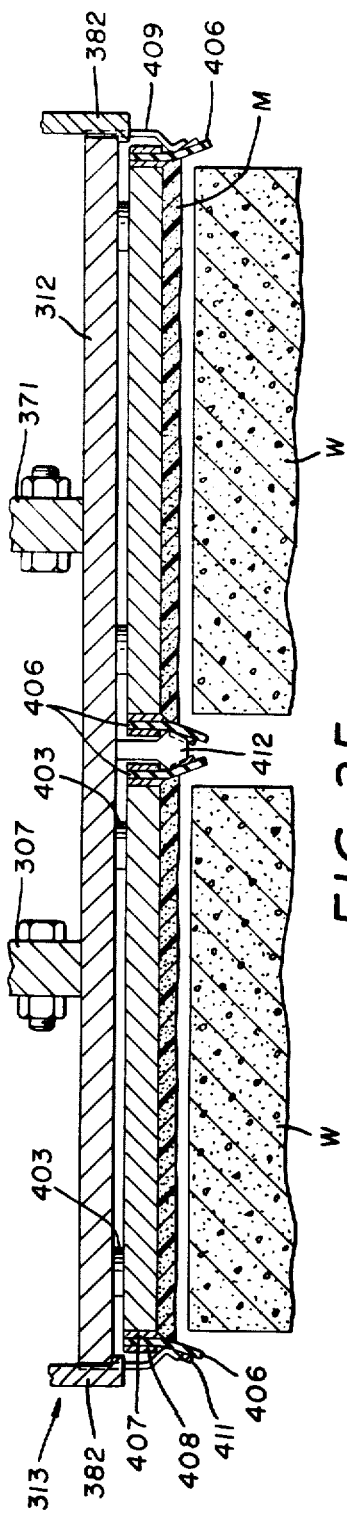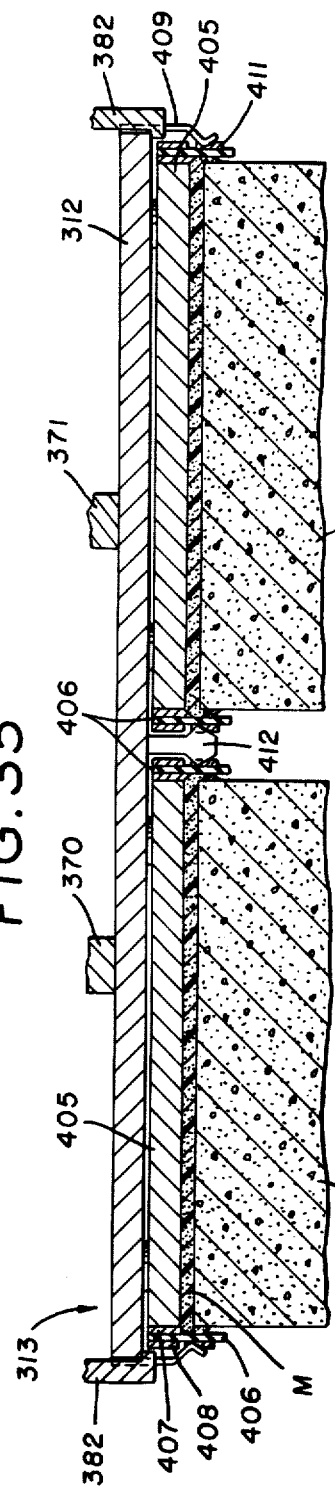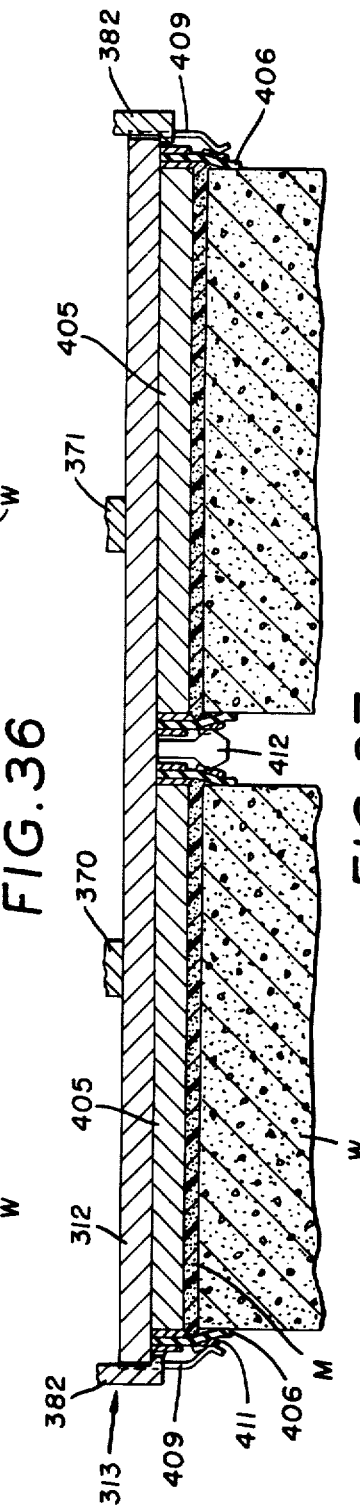

MOLD ASSEMBLY FOR APPLYING A DECORATIVE FACING TO AN ARTICLE

This is a Division of application Ser. No. 242,938, filed Apr. 11, 1972 now U.S. Pat. No. 3,799,717.

BACKGROUND OF THE INVENTION

This invention generally relates to apparatus for automatically affixing a decorative facing to an article. More specifically, this invention relates to a system for applying a plastic facing to concrete blocks and the like, which system includes a plurality of work stations each pereforming a unique function.

It is often desirable in the construction industry, to erect a building or wall of a building out of an inexpensive material such as conventional concrete blocks. Because such blocks, however, have little or no aesthetic characteristics, a tile or marble-like facing is frequently added to one or more sides of the blocks. With the advent of modern polyester resin thermoplastics, industry has made an increasing demand for such decoratively faced blocks in volume.

The first attempts at decoratively facing cinder blocks involved placing a block in a tray filled with a fluid plastic material and allowing the plastic to harden thereon. This method was quite tedious and time-consuming and it often took an entire day for the material to satisfactorily harden. Later, changes in the composition of the plastic material permitted the compound to cure and harden on the block after a heating period of about two to three hours. After such a heating, long cooling periods were required before the block could be removed from the tray. Whether heated or not, however, the method of placing the block onto the material was entirely unsatisfactory. The weight of the block would, of course, cause the material to ooze out around the edges of the block and often the settling of the block would not be uniform thereby causing an uneven decorative face. As a consequence, even in a block which did settle properly, the flash around the sides of the block often requires removal. Further, this process did not lend itself well to utilizing plastic compounds having aggregate therein. That is, the nonuniformity would be compounded in the presence of granite, marble, glass chips or the like in the plastic, this aggregate material being desirable to create various aesthetic and realistic patterns in the finished product.

The most flagrant deficiency of the prior art of which I am aware, in addition to that previously described, relates to the fact that batch processes were involved which required a great deal of manual labor. In those systems which utilized heat to accelerate the curing process, a plurality of blocks were placed by hand onto a number of molds, after the molds were manually filled with the plastic resin material. Then the group of molds were placed in a large stationary oven for curing of the material. Of course, by the time all the molds had received a block some curing had already taken place such that the finished products represented varying degrees of cure. This was unfortunate in that the facing on the blocks placed last in the batch often did not properly adhere to the block.

In short, the prior art has been plagued with inefficient, time-consuming and manual efforts. To my knowledge, no apparatus has been developed which would lend itself to a significant degree of automation in the process of applying decorative facings to an article. The lack of automation is probably primarily occasioned by the tendency of the prior art to require that the article be placed in a mold filled with plastic material. Thus, any attempt at an automated apparatus was fraught with the difficulty encountered in accurately placing an article in a mold having curable material therein. Because this primary shortcoming has not been overcome, there has been a paucity in the development of other automated devices such as a means to accurately transfer an article, accurately positioned, to a location to properly communicate with a mold. Similarly, no means have been developed to automatically remove the molds after curing, to automatically recycle the removed molds, to automatically fill the molds prior to curing, and to automatically load and unload blocks into and out of a curing system. Finally, no system has been developed which would universally apply to a wide variety of articles regardless of size or shape.

SUMMARY OF THE INVENTION

It is therefore a primary object of the present invention to provide a system for automatically applying a decorative facing to an article such as a concrete block and other building materials.

It is a related object of the present invention to provide a system, as above, which through a carrousel-type arrangement intermittently moves blocks from station to station thus avoiding the batch type process.

It is another object of the present invention to provide a system, as above, which includes a transfer device for simultaneously automatically loading and unloading blocks to and from pallets arranged on the carrousel.

It is a related object of the present invention to provide a system, as above, which includes a device that automatically conveys blocks in pairs to the transfer device and that also prepares a block surface for receipt of the decorative facing.

It is still another object of the present invention to provide a system, as above, which includes a means for centering pairs of blocks on a pallet.

It is yet another object of the present invention to provide a system, as above, that includes a station at which a mold is placed in registry on top of the pairs of blocks on a pallet.

It is a related object of the present invention to provide a system, as above, which includes a novel mold member with self-locking and fluid plastic containment features so that when placed on top of a block it is held in a proper position so that there is no displacement of the material down the sides of the blocks to produce uniform blocks with smooth edges and junctions and to provide a predetermined fluid plastic thickness on each faced piece of building or other materials.

It is a related object of the present invention to provide a system, as above, which includes a means for automatically filling the molds with a plastic resin material.

It is a related object of the present invention to provide a system, as above, that includes a device which transfers a filled mold to the station at which said mold is placed in predetermined accurate registry on the blocks or building materials to provide quality control production of the finished product.

It is a further object of the present invention to provide a system, as above, which includes novel synchronized heating and thermo-reaction units to cure the lastic resin onto the block in proper sequence and rder and in a shorter period of time than heretofore ossible and also to render it possible to efficiently cure sins which include aggregate and related mixtures.

It is a still further object of the present invention to rovide a system, as above, which includes a means to utomatically remove the molds from the blocks and ansfer said molds to the filling station.

It is another object of the present invention to pro- ide a system, as above, which can be adjusted to oper- te on a wide range of sizes and shapes of blocks or ther articles.

These and other objects of the present invention hich will become apparent from the Description of ie Preferred Embodiment are accomplished by means ereinafter described and claimed.

In general, the system described, which applies a dec- rative facing to an article such as a conventional con- rete block, consists of a carrousel arrangement which itermittently drives a plurality of pallets through a plu- ility of work stations. The pallets ride on a stationary wer frame below an upper movable frame with the osition thereof being adjustable to accommodate arying sized blocks or articles and to allow unlimited djustment of the desired thickness of the facing mate- al. Numerous of the work functions are performed hile the pallets are in the rest portion of their intermit- nt cycle. For example, a transfer mechanism removes finished pair of blocks from a pallet transferring them a take-away conveyor while simultaneously the iechanism picks up a new pair of blocks from an in- ike automatic block feeder and places them on an mpty pallet. The intake block feeder has automati- ally and accurately positioned a pair of blocks after reparing the blocks for finishing, as by trimming the dges of the surface to be faced to remove sand and grit urrs therefrom.

After being loaded onto a pallet, the pair of blocks rst encounter a centering station to assure that the locks are precisely positioned on the pallet so that hen arriving at the next station, the mold-receiving ation, they will properly receive in registry a mold lled with an uncured thermosetting plastic resin mate- al. The mold, which is capable of being locked to the p of the blocks, is transferred to the block by a swing- g arm having adjustable features to provide a uniform iickness for each block face. This arm, in turn, re- eives filled molds from a mold-filling station located roximate thereto.

Once the blocks have a mold affixed thereto, an oven entered with the blocks intermittently traveling irough automatically cycled heat surge zones during ie following cycles of the carrousel drive. The amount f heat and the duration of the same is automatically ontrolled at each surge zone within the oven so that hen emerging from the oven, the resin has structured self by thermo-setting cycles and has become cured nd bonded to the blocks. The molds are thereafter re- oved and transferred, while still quite warm, to the iold-filling station for immediate re-use. The finished lock continues on to the unloading station previously escribed.

The preferred embodiment of the present invention, s summarized above, is shown by way of example in ie accompanying drawings and hereinafter described i detail without attempting to show all the various rms and modifications in which the invention might be embodied; the invention being defined in and mea- sured by the appended claims and not the details of the specification.

BRIEF DESCRIPTION OF THE DRAWINGS

FIG. 11 is a sectional view taken substantially along line 11—11 of FIG. 10.

FIG. 12 is a sectional view taken substantially along line 12—12 of FIG. 11.

FIG. 13 is a view of the operation of the block feeder sequentially following FIG. 12.

FIG. 14 is a sectional view taken substantially along line 14—14 of FIG. 13.

FIG. 18 is a sectional view taken substantially along line 18—18 of FIG. 16.

FIG. 19 is a sectional view taken substantially along line 19—19 of FIG. 16.

FIG. 25 is a somewhat schematic sectional view of the means which transfers a filled mold to the article to be faced and is taken substantially along line 25—25 of FIG. 1.

FIG. 30 is a view sequentially following FIG. 28 in the operation of the mold transfer device and is found on the sheet of drawings with FIG. 25.

FIG. 32 is a sectional view taken substantially along line 32—32 of FIG. 26.

FIG. 33 is a sectional view taken substantially along line 33—33 of FIG. 28.

FIG. 34 is a view taken substantially along line 34—34 of FIG. 32.

FIG. 35 is a sectional view showing the mold plate being placed on the article to be faced.

FIG. 26 is a sectional view sequentially following FIG. 35 and showing the mold plate about to move with respect to the molds.

FIG. 37 is a sectional view sequentially following FIG. 36 and showing the mold plate and molds located in place on the article.

FIG. 55 is a perspective view of a block having a decorative facing thereon, slightly broken away, which is an example of the type of product which can be manufactured according to the concepts of the present invention, and is found on the sheet of drawings with FIG. 1.

FIG. 56 is a sectional view taken substantially along line 56—56 of FIG. 55, and is found on the sheet of drawings with FIG. 1.

FIG. 57 is an enlarged view of a portion of that shown in FIG. 56, and is found on the sheet of drawings with FIG. 1.

DESCRIPTION OF THE PREFERRED EMBODIMENT

Figure 1:
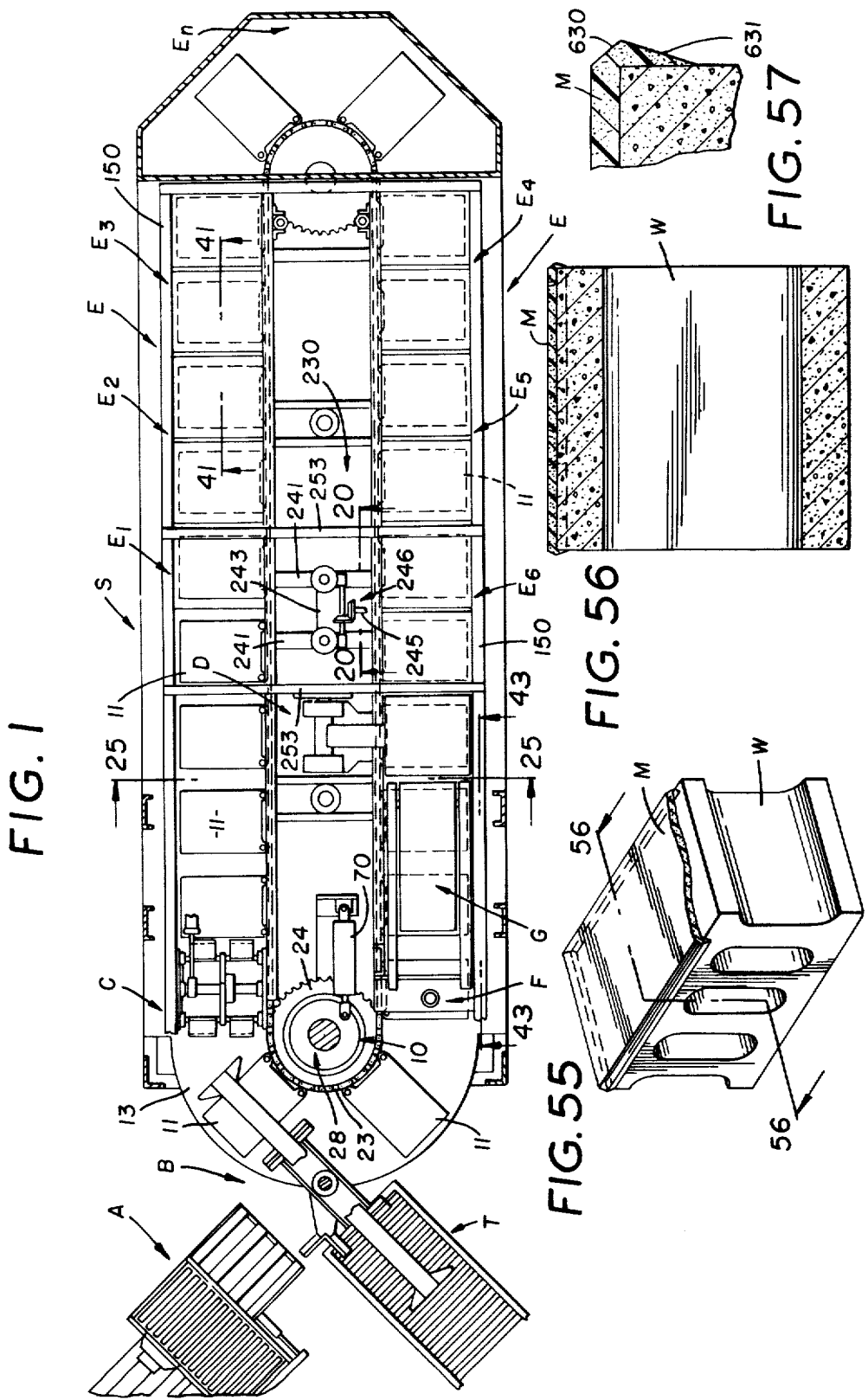
FIG. 1 is a top plan view of the overall system for ap- plying a decorative facing to an article.

The overall system for applying a decorative facing to an article or workpiece is indicated generally by the letter S in FIG. 1. While it will become apparent that the system S is capable of applyiing such a coating to a variety of articles, particularly in the area of building or construction materials, a conventional concrete block will be referred to herein as a typical example.

The system S consists most basically of a carrousel type arrangement which transfers the concrete blocks through a plurality of work stations. The blocks are first systematically transferred to the system S by a feeder assembly indication generally by the letter A. As will hereinafter be evident, the block feeding station A also performs the function of edging the blocks to remove burrs and other obstructions which may be present thereon. Feeder A presents the blocks in pairs to a transfer mechanism at station B which performs the function of loading a pair of blocks from feeder A into system S in a manner to be described. Simultaneous with this loading function, the transfer mechanism removes a pair of finished blocks to a takeaway conveyor T which can be a standard item.

As the blocks are moved through the system S, they next encounter a centering station C which precisely positions the blocks for subsequent operations at other stations within the system S. The now centered blocks then enter Station D where they receive a unique mold which has been previously filled with a curablle material. Once these molds are transferred to and locked upon the blocks at station D, the blocks enter an oven, indicated generally as station E in FIG. 1. The oven station consists of a series of controlled heat surge zones in which the material is cured onto the blocks.

When emerging from the oven station E, the molds are removed from the block at removal station F and inverted while being transferred to a mold filling station G. At station G, a metering applicator automatically fills the molds which are thereafter transferred to an arm which constitutes a portion of the mold receiving station D, which arm then transfers the mold to the waiting block to be coated. The finished block then moves on to station B to be removed from the system S.

Figure 2:
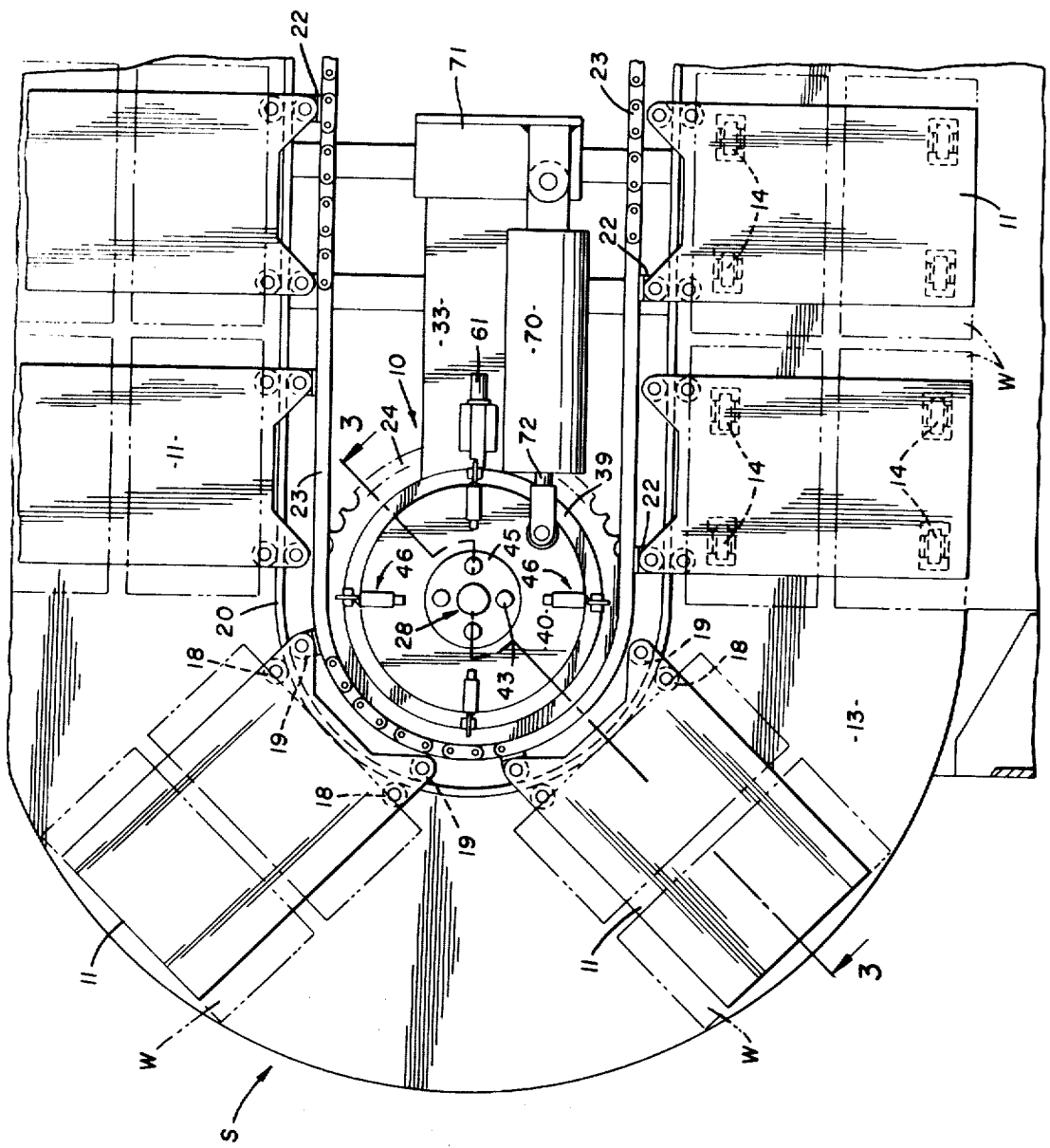
FIG. 2 is an enlarged top plan view of the drive mech- anism for the carrousel system.
Figure 3:
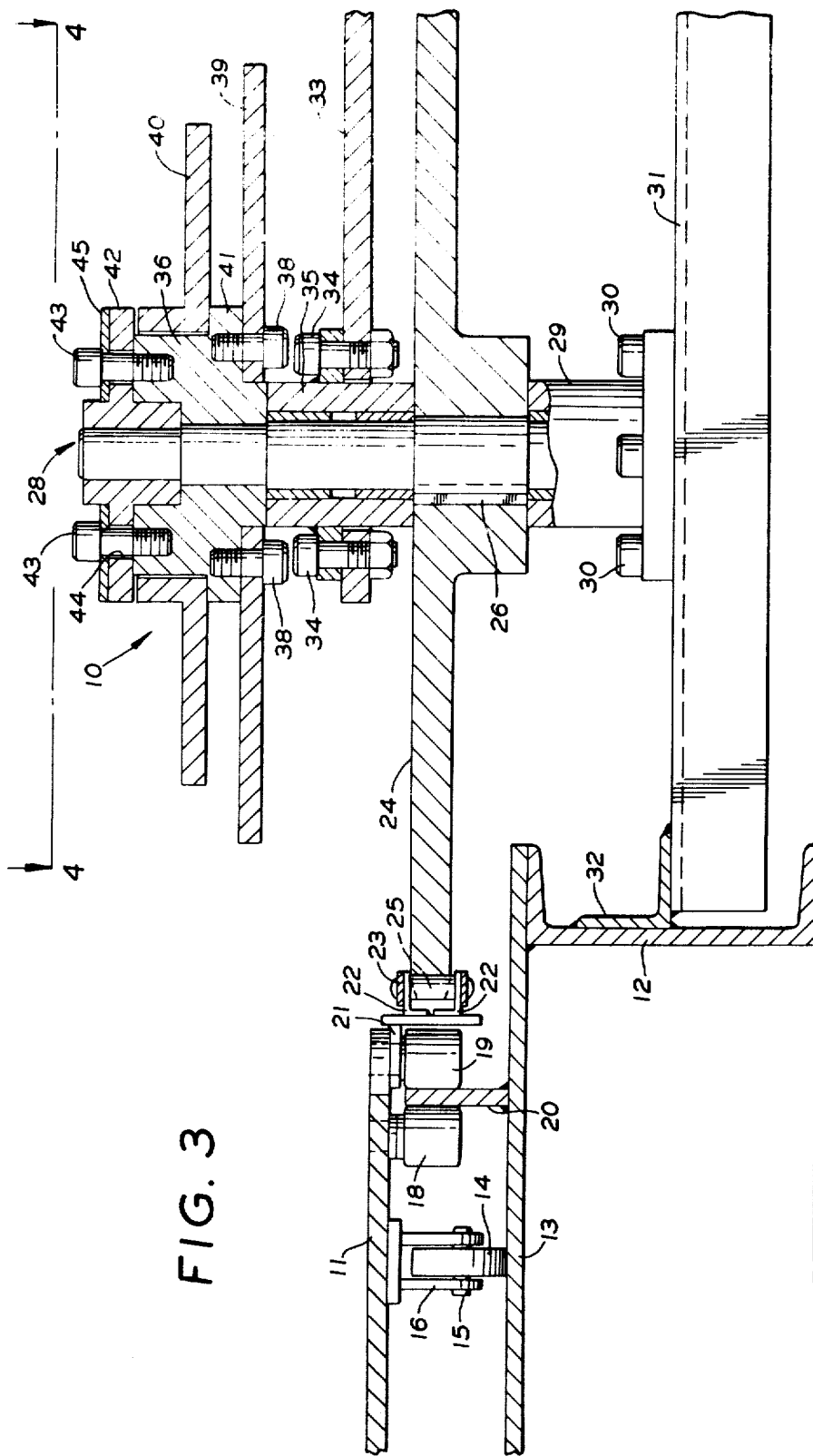
FIG. 3 is a sectional view taken substantially along line 3—3 of FIG. 2.

The manner in which the blocks are conveyed intermittently from station to station within the system is best shown in FIGS. 2-5, inclusive. FIG. 2 is a plan view of the index drive mechanism indicated generally by the numeral 10 which is also shown somewhat schematically in FIG. 1. Drive mechanism 10 serves to intermittently move a plurality of pallets 11, each of which is adapted to carry two blocks or workpieces W through the system. As best shown in FIG. 3, a channel frame 12 rests on the floor and carries a platform 13 upon which the pallets travel on a series of wheels 14 mounted on axles 15 carried by axle supports 16. Rotatably depending from each pallet 11 are follower rollers 18 and 19 which ride on track 20 welded to platform 13.

Received around the axle of a roller 19 of each pallet 11 is a generally L-shaped bracket 21 which supports two clevises 22 which, in turn, are fixed to a link of a drive chain 23. A sprocket 24 having teeth 25 is keyed, as at 26, to a stepped spindle shaft indicated generally by the numeral 28. Shaft 28 is rotatably journaled in a collar bearing 29 which is bolted, as at 30, to a beam 31 which is supported by base frame 12 through angle 32.

The shaft 28 also carries a support plate 33 which is fixed, as by bolts 34 to a bearing collar 35. Bearing collar 35, will not rotate with shaft 28 but rather remains stationary free from sprocket 24.

Figure 4:
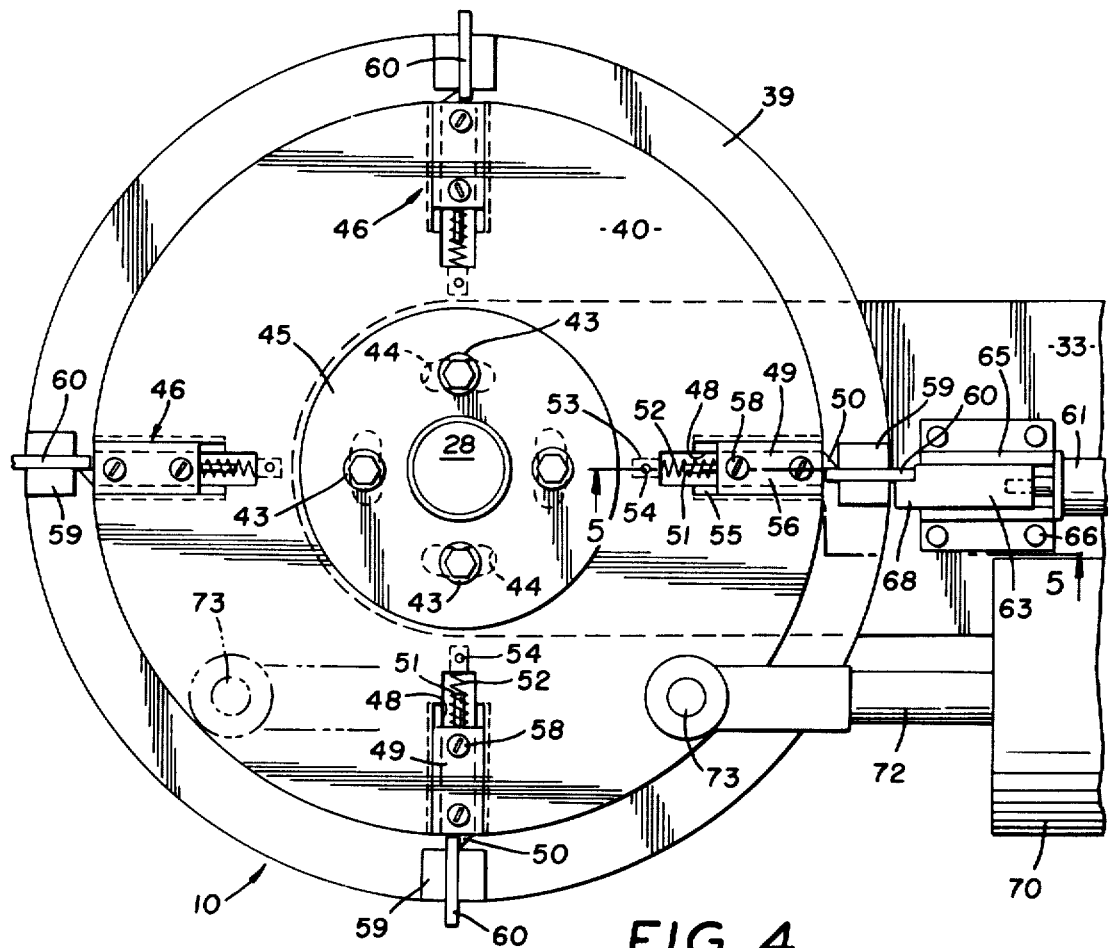
FIG. 4 is a top plan view taken substantially along line 4—4 of FIG. 3.

Resting atop collar 35 and affixed to shaft 28 is a support block 36 which via volts 38 carries for rotation therewith, a circular path 39. A circular drive plate 40 rests upon a shoulder 41 in support block 36 and is freely retained therein by a cap 42 attached to shaft 28 and affixed to block 36 by bolts 43. As best shown in FIG. 4, bolts 43 are received through arcuate slots 44 in cap 42 and extend through a washer plate 45. As will hereinafter become evident, the arcuate slots 44 provide an adjustment feature to assure proper timing and interrelation between the associated elements.

Figure 5:
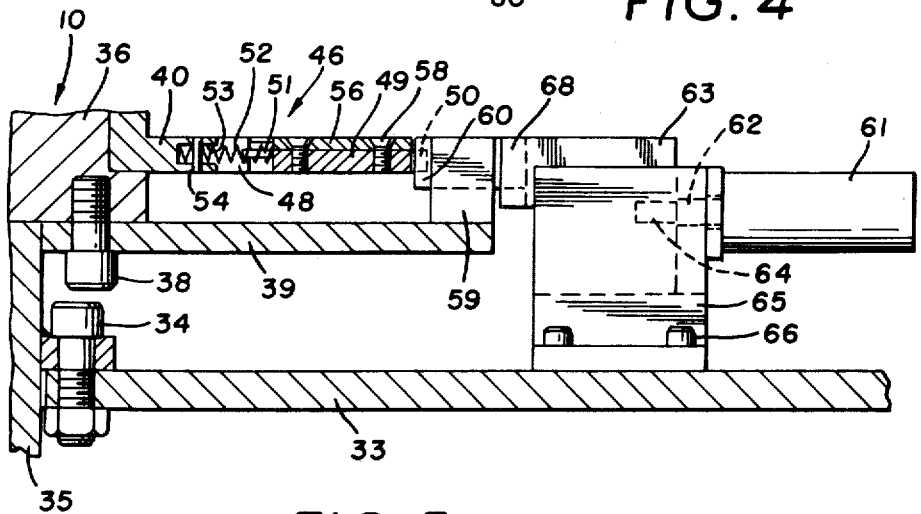
FIG. 5 is a sectional view taken substantially along line 5—5 of FIG. 4.

As best shown in FIGS. 4 and 5, drive plate 40 includes, at four equally spaced circumferential locations, spring loaded plunger assemblies indicated generally by the numeral 46. A generally rectangular slot 48 is cut within plate 40 to receive each assembly 46. Slidably received within slot 48 is a plunger plate 49 having a generally triangular plunger stop 50 extending radially outward of the drive plate 40. The radially inward shoulder portion of plunger plate 49 carries a pin 51 which receives a spring 52 extending radially inward. Spring 52 is received within a bore 53 in plate 40 and is maintained therein by a pin 54. A shelf 55 is formed in plate 40 upon which rests a shouldered guide plate 56 connected to plunger plate 49 as by bolts 58. Plate 56 thus maintains the plunger plate 49 vertically within slot 48.

Circular plate 39 is shown as being of a slightly larger diameter than drive plate 40 and includes, at four circumferentially spaced locations, blocks 59 which extend vertically to a height generally coincident with drive plate 40. Each block 59 carries a stop bar 60 which extends radially inward to the approximate circumference of plate 40 to selectively engage plunger stop 50 and which extends radially outward beyond the diameter of plate 39.

The support plate 33 carries at its outer end a control cylinder 61 having a piston rod 62 which is threaded into a stop block 63, as at 64. Block 63 is slidably supported in guide block 65 mounted by bolts 66 to plate 33. The radially inward portion 68 of block 63 is adapted to selectively engage the stop bar 60 on plate 39.

As best shown in FIG. 2, a power cylinder 70 is supported by frame 71 and includes a piston rod 72 fixed at its end by a swivel pin connection 73.

In the operation of the index drive mechanism 10, the components just described can be assumed to be in the position shown in FIG. 4. From this position, the control cylinder 61 first strokes to the right moving block 63 from contact with bar 60. Shortly thereafter, the power cylinder 70 strokes to the left, to the chain line position in FIG. 4 causing plate 40 to rotate clockwise approximately 90°. This action will rotate the spindle 29 and the sprocket 24 thereby advancing all the pallets 11 connected to the chain 23 to their next adjacent position. After the bar 60 clears portion 68 of block 63, the cylinder 61 returns block 63 to the left in FIG. 4 to stop the next adjacent bar 60 on plate 39. The retraction stroke of power cylinder 70 back to the solid line position causes plate 40 to move counterclockwise and with respect to plate 38 back to its original position. Because plunger plate 49 is spring loaded, the sloped surface of plunger stop 50 will slide over bar 60 to engage the same for the next indexing stroke. Because plate 40 freely rests upon shoulder 41 of block 36, the reverse movement thereof does not rotate spindle 28. By merely arrainging the timing of cylinders 61 and 70 through electrical controls (not shown) the pallets 11 can be intermittently indexed or transferred through the system S at a preselected speed and can be maintained at each station for a predetermined time period.

Having now described the manner in which the pallets which carry the blocks are conveyed within the system S from station to station, the apparatus and operation of each station and related apparatus will now be described in detail.

Figure 6:
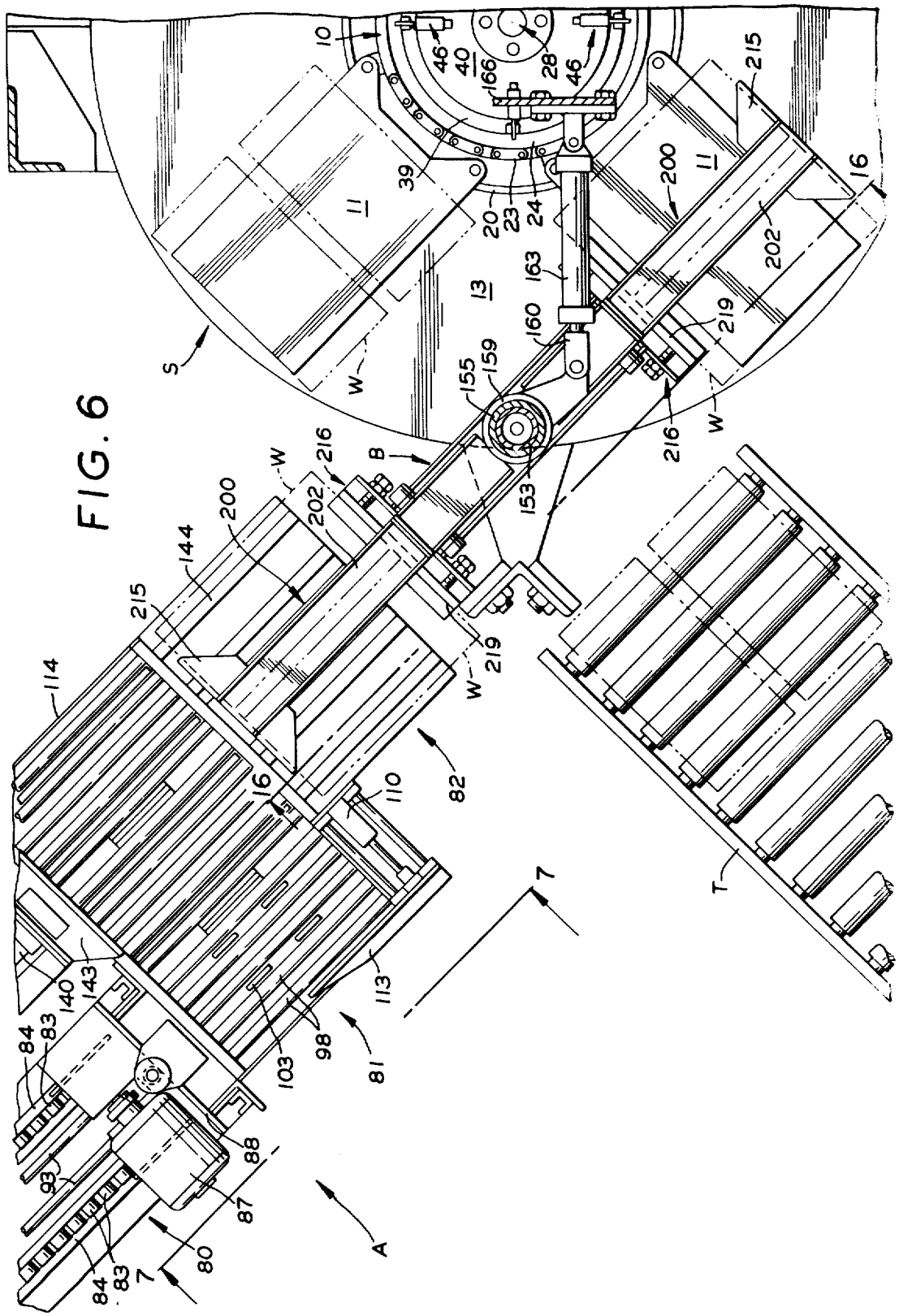
FIG. 6 is an enlarged top plan view of the general loading and unloading area for the system.

A block feeder and edger assembly has been generally indicated by the letter A in FIG. 1, is shown in detail in FIGS. 6–15, inclusive, and is the device which transfers blocks to the system S. As best shown in FIG. 6, assembly A consists of three basic portions, a blocker feeding and edging portion indicated generally by the numeral 80, a transverse block pairing portion indicated generally by the numeral 81, and a block pair pickup portion indicated generally by the numeral 82. The feeding and edging portion 80 consists most basically of a plurality of rollers 83 which are journaled into two generally parallel tracks 84 supported between vertical stanchions 85 and 86.

An electric motor 87 is also supported by stanchions 86 via a mounting bracket 88. Motor 87 drives two edging cutters 89 as by belt 90. The block or workpiece W moves by gravity on rollers 83. By the time a block W reaches the position shown in FIGS. 7 and 9, the rolls are substantially horizontal and the gravity conveyance ceases.

Figure 7:
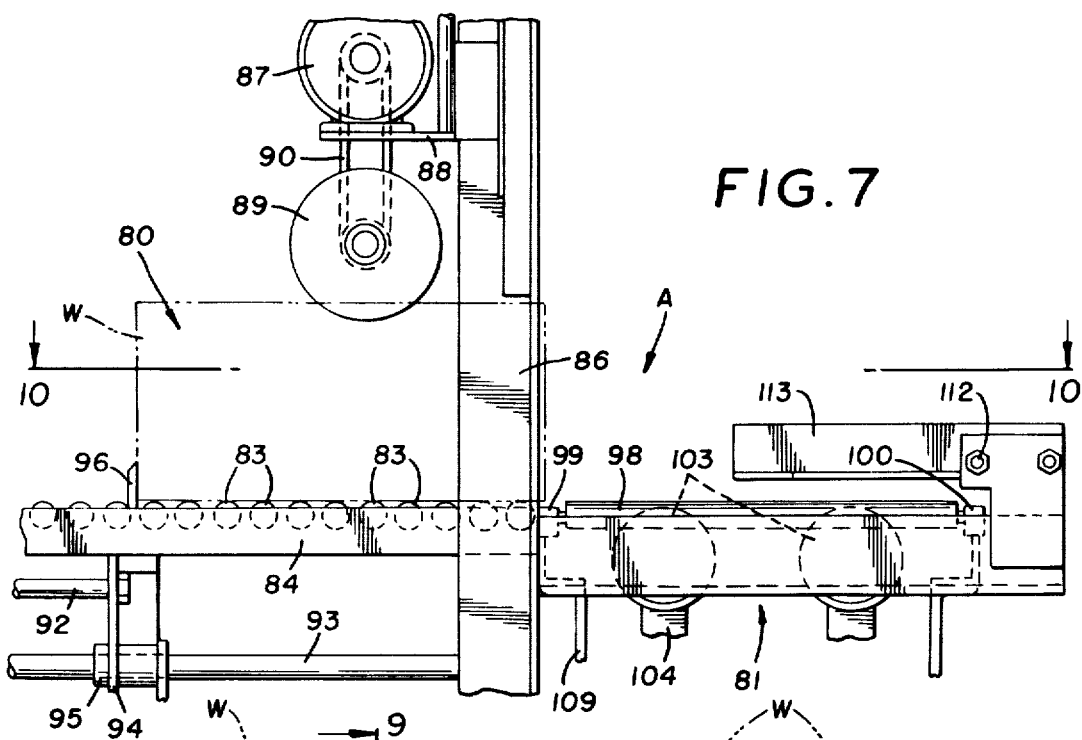
FIG. 7 is a side view of the intake block feeder taken substantially along line 7—7 of FIG. 6.
Figure 8:
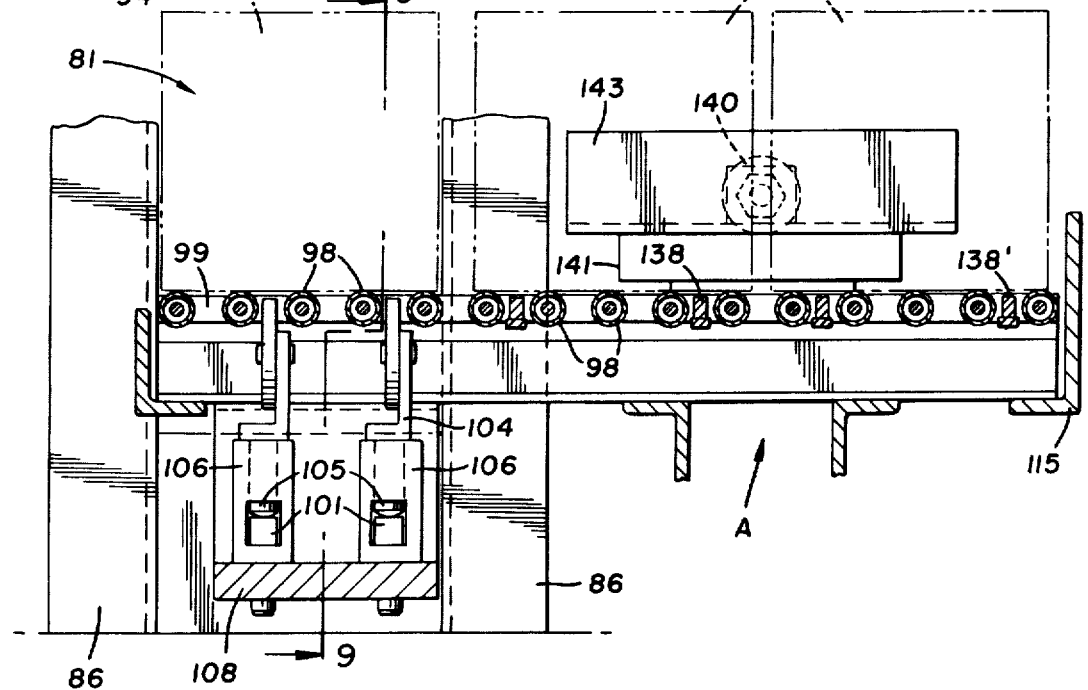
FIG. 8 is a sectional view taken substantially along line 8—8 of FIG. 10.
Figure 9:
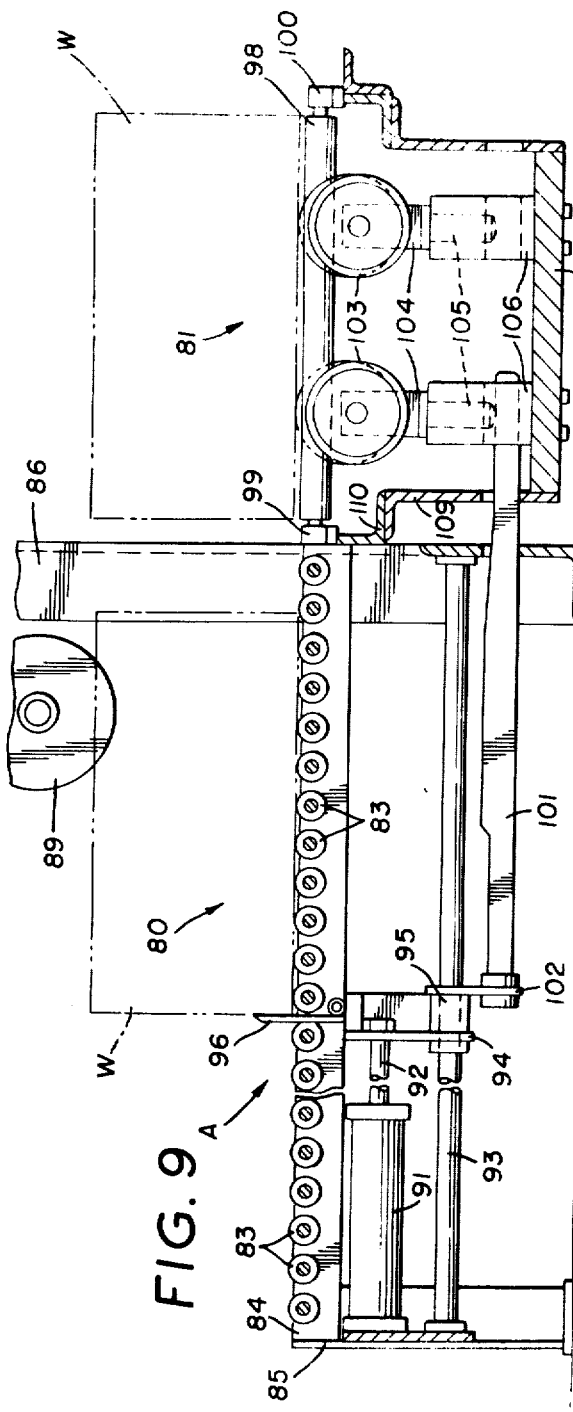
FIG. 9 is a sectional view taken substantially along 9—9 of FIG. 8.
Figure 17:
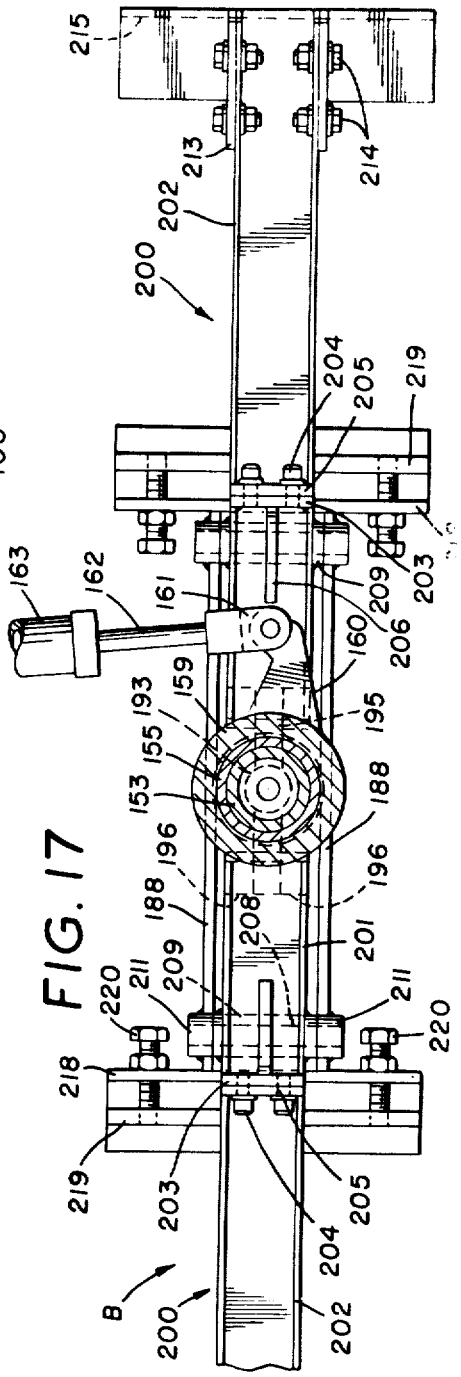
FIG. 17 is generally a top view taken substantially along line 17—17 of FIG. 16, and is found on the sheet of drawings with FIG. 9.

A stroking cylinder 91 is located generally between and below the rollers 83 and is mounted on stanchion 85. The long piston rod 92 of cylinder 91 is supported along its length by two guide or support rods 93 connected to the piston rod 92 as by brackets, 94. The brackets 94 are mounted on bushings 95 which are slidable along rods 93. Operatively affixed to the end of the rod 92 is a spring loaded pusher arm 96 which is shown in FIGS. 7 and 9 as being vertically located behind a block W. When in this position, upon a stroking of the cylinder 91 the block is transferred from the feeder portion 80 to the pairing portion 81, as shown in FIG. 9. During this movement, the upper edges of the blocks W are trimmed and smoothed by the cutters 89. When the block reaches the pairing portion 81, the rod 92 is retracted by the cylinder 91 and the arm 96 is rotated counterclockwise, by contact with the underside of the next block having come into position, until it is retracted to the FIG. 9 position at which time the spring biased arm 96 returns to the vertical position behind the next block.

Figure 10:
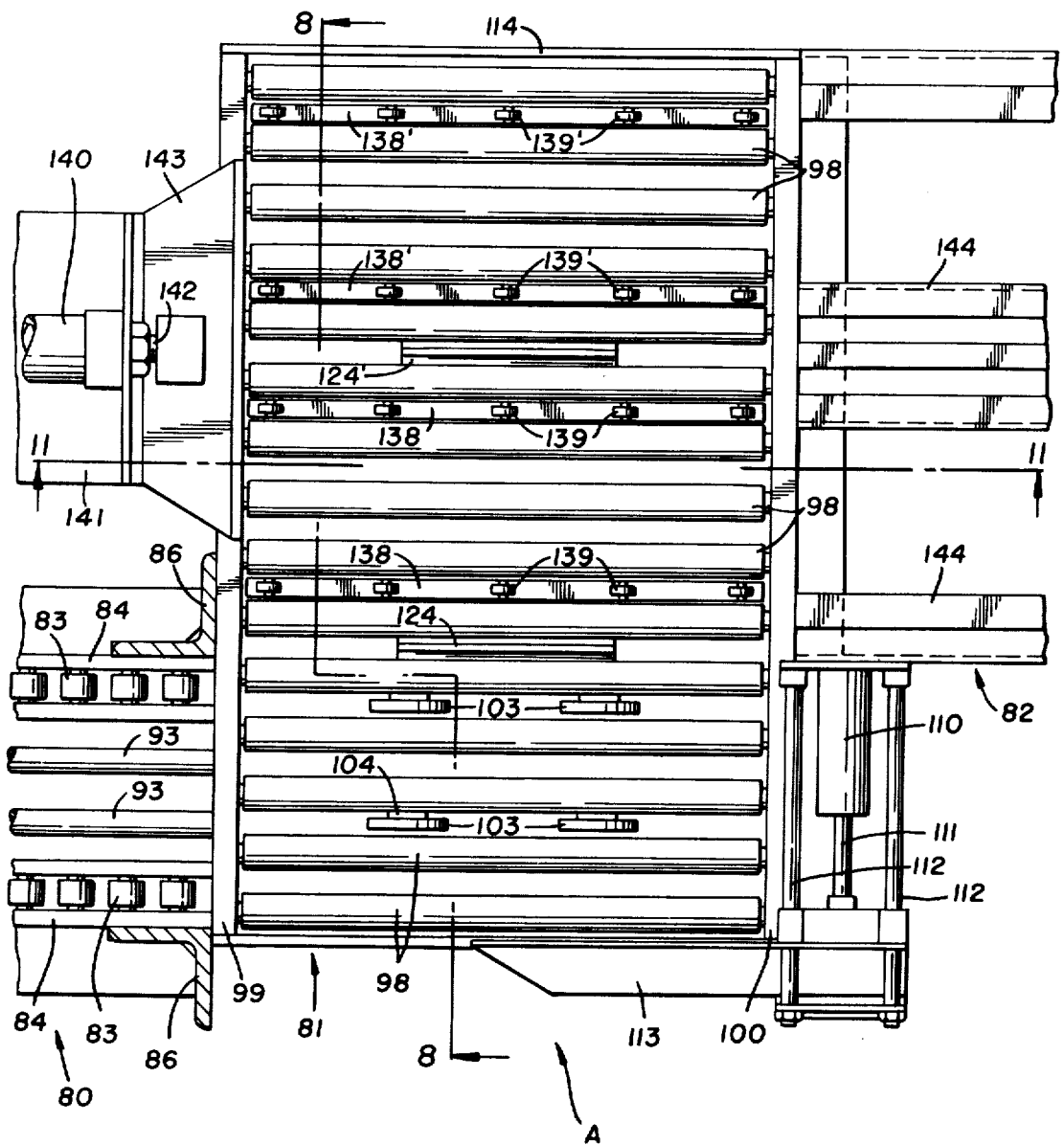
FIG. 10 is generally a top view of the intake block feeder taken substantially along line 10—10 of FIG. 7.

As best shown in FIG. 10, the prime components of the pairing portion 81 of feeder A are rolls 98 which are journaled between frames 99 and 100. Because the rolls 98 are journaled to rotate in a direction generally transverse to that of rollers 83, the sliding action of a block W from feeding portion 80 to pairing portion 81 by operation of cylinder 91, just described, would tend to adversely wear rolls 98. In order to avoid this, the guide rods 93 also each support a cam 101 as by cam holding brackets 102 (FIG. 9). Cams 101 raise and lower four friction reducing wheels 103 which are rotatable in the same direction as rollers 83. Wheels 103 are rotatably supported by brackets 104 to which are mounted cam followers 105 slidable in guide blocks 106 (FIG. 9). Blocks 106 are supported by plates 108 which are in turn supported by stanchion 86 through angles 109 and 110. Angles 109 as well as blocks 106 are slotted to receive the cam 101. As the cylinder 91 strokes to move a block onto pairing portion 81, the bushings 95 slide along rods 93 to move the cams 101 through blocks 106. The wheels 103 are thereby raised by the interaction of followers 105 and cams 101 to the chain line position of FIG. 9 permitting the block to roll thereon without touching rolls 98. As the cylinder 91 retracts, the cam, of course, reverses lowering the block onto rolls 98.

As rolls 98 are contacted, a switch (not shown) activates a cylinder 110 (FIG. 10) through piston rod 111 and guide rod assemblies 112, pulls a plate 113 laterally (upwardly in FIG. 10) to start a block moving along rolls 98. Once so started, the block can move by gravity or could be moved by a cylinder 110, as shown in FIG. 12, until a stop bar 114, supported by angle 115 which extends between frames 99 and 100, is connected as shown in FIG. 13.

The mechanism for pairing and preparing the blocks for movement to the pickup station 82 is best shown in FIGS. 12–15, inclusive, as including two generally similar assemblies 116 and 116' which will be described together but whose operational sequence somewhat differs in a manner to be hereinafter described. Cylinders 118, 118' have pistons rods 119, 119', each of which are connected to two cam blocks 120, 120' (four in total) each having first generally cylindrical surfaces 121, 121' and second cylindrical surfaces 122, 122' of larger diameter connected via tapered or conical surfaces 123, 123'. Affixed to the top of cam blocks 120, 120' are wedge shaped stop bars 124, 124'. Of course, one skilled in the art could readily replace the single cylinder 118, 118' with two cylinders, one for each cam block 120, 120'.

With the stop bars 124, 124' in the down postion, that is, with their top surfaces generally parallel to the rolls 98, cam follower rollers 125, 125' are resting on surfaces 121, 121'. Cam follower rollers 125, 125' are rotatable in brackets 126, 126' which are fixed to channel-shaped guide bars 128, 128'. The guide bars 128, 128' are biased to the left (FIG. 12) by springs 129, 129' to maintain the cam follower rollers 125, 125' in contact with the cam blocks 120, 120'. The bars 128, 128' are guided in blocks 130, 130' which are mounted on a frame 131. Also mounted in frame 131, and best shown in FIG. 14, are collars 132, 132' which receive support rods 133, 133' that hold plates 134, 134'.

Extending across the channel in each bar 128, 128' are two longitudinally spaced cam rollers 135, 135' (four in total) which contact sloped cam surfaces 136, 136' depending from plates 134, 134'. Plates 138, 138' are fixed above plates 134, 134' and each carry five rollers 139, 139' (920 in total, see FIG. 10).

In the operation of the mechanism 116, 116', as the block W shown in FIG. 12 passes over rolls 98 and contacts stop bar 114, a switch (not shown) activates cylinder 118' which moves upwardly to the FIG. 13 position causing the cam followers 125' to move along surfaces 123' and 122' translating bars 128' to the right. This movement allows cam rollers 135' to contact sloped cam surfaces 136' raising rollers 139' to thereby raise the block W. Stop bar 124' is also raised to a position behind the block.

As the next block contacts stop bar 124' a switch (not shown) activates cylinder 118 which through the sdamem process just described with respect to cylinder 118' raises rollers 139 to hold the second block above rolls 98. With two blocks thus supported and accurately spaced by bar 124', a cylinder 140 (FIGS. 10 and 11) is activated to transfer the pair of blocks from portion 81 to portion 82 of feeder A.

Cylinder 140 is mounted on a support 141 and has a piston rod 142 which carries a stroking plate 143 at its end. Stroking plate 143 transfers the pair of blocks on rolls 139, 139' to the pickup portion 82 of feeder A which can consist of table frame members 144 which could be rolls. Once a pair of blocks is positioned on frame members 144, more blocks are able to move down rolls 98 to be paired and the continuous nature of feeder A is thereby accomplished. The pair of blocks are now in a position to be picked up by the transfer mechanism B and transmitted to a pallet 11, in a manner now to be described.

The transfer mechanism B is best shown in FIGS. 6 and 16–19, inclusive, as the device which simultaneously loads a pair of edged blocks onto an empty pallet 11 and removes finished blocks to a takeaway conveyor T. The mechanism B is carried by an upper support plate 147 from which a channel 151 is dependingly secured as by angles 152. As best shown in FIG. 18 a hollow tube 153 is slidably received through channel 151. A cylindrical sleeve 151 is fixed to plates 154 and extends around tube 153 and supports a collar 159 which is welded to a sleeve 157 which has a vertical slot 156 therein which receives a pin extending outwardly of tube 153. As will hereinafter be evident, through this connection the tube 153 and sleeve 157 can be rotated together but the tube 153 can be moved vertically within sleeve 157. Collar 159 has on ear 160 affixed thereto which is pin connected by clevis 161 to the piston rod 162 of a power cylinder 163 which, as will hereinafter become evident, rotates the transfer mechanism B 90° to load and unload blocks. Cylinder 163 is connected by pin assembly 164 to a bracket 165 depending from an angle 166 welded to channel 151. A gusset plate 168 aids in the support of cylinder 163 and its associated members.

A power cylinder 169 is trunnion mounted, as at 170, to angles 171 which are supported by plates 172 on channel 151. The piston rod 173 of cylinder 169 is jointly secured, as by a pin 174, to the adjacent ends of two generally boomerang shaped arms 175 which pivot on pin 176 fixed to plates 178 extending between plate 147 and channel 151. The other end of each arm 175 as slots 179 in which ride ears 180 of a bar 181 that rests on a shoulder 182 within and near the top of tube 53. Bar 181 is maintained on shoulder 182 by a threaded insert 183 at the top of tube 153. In this manner, tube 153 can rotate about bar 181 but will move vertically with bar 181. As will be hereinafter evident, this connection allows cylinder 169 to control the vertical position of the transfer mechanism B.

The bottom of tube 153 is fixed to a collar 184 which includes an insert sleeve 185 that extends into tube 153 to give rigidity to the same. Depending from collar 184 are two frame members 186 having generally rectangular base portions 188 and collar engaging portions 189. A channel 190, extending between base portions 188 of frames 186 supports a power cylinder 191 whose piston rod 192 is affixed to a collar 193. Collar 193 slides in but rotates with a bar 194 attached to collar 184 in a manner such as the pin-slot connection 156, 158 of tube 153 and sleeve 157.

Figure 16:
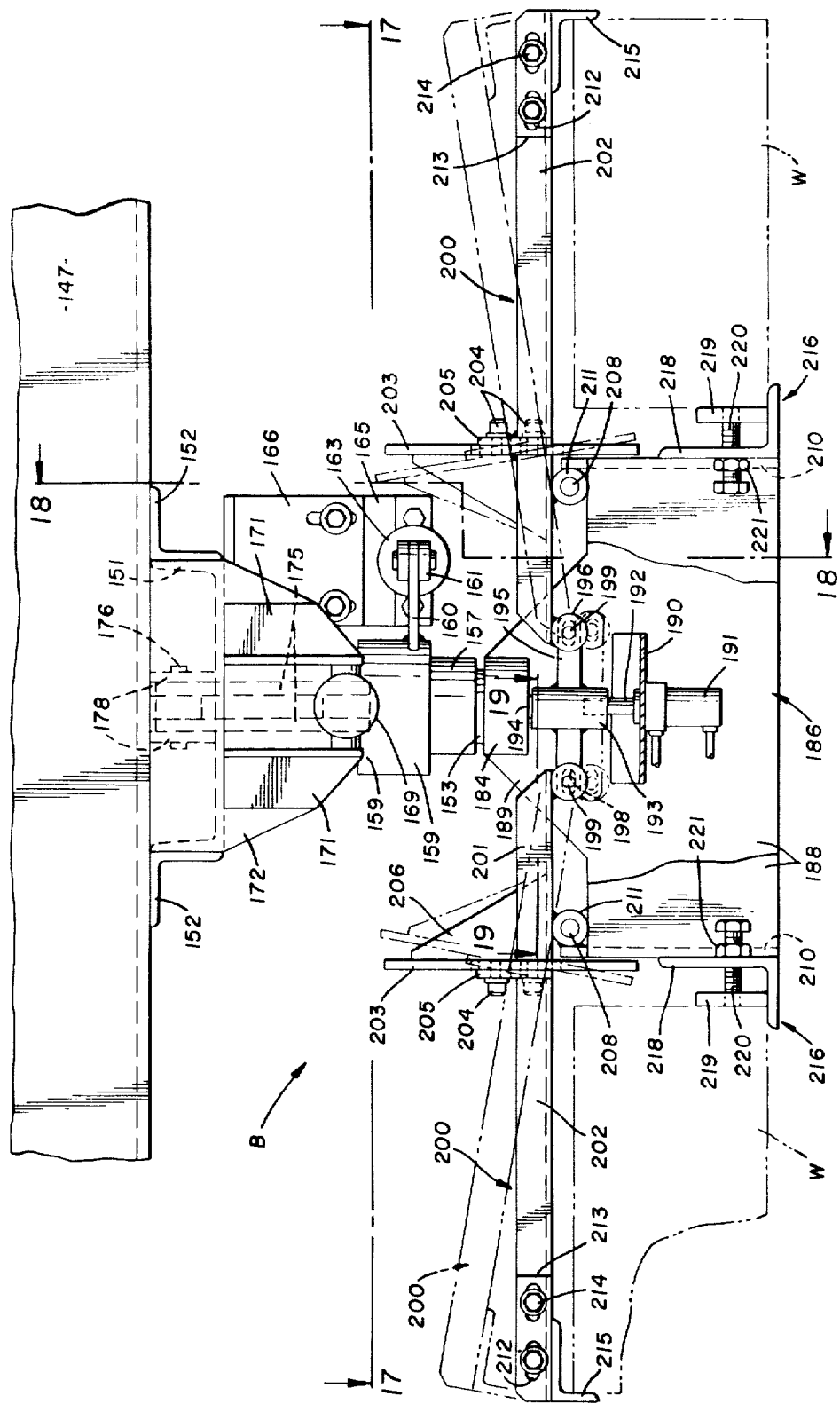
FIG. 16 is a sectional view taken substantially along line 16—16 of FIG. 6 and showing the device which transfers the articles from the intake block feeder to the system and from the system to a take-away con- veyor.

As best shown in FIGS. 16 and 19, collar 193 has two ear-like projections 195 which terminate with cylindrical members 196 which are slotted as at 198. The ear projections 195 are fixed to members 196 via pins 199 riding in slots 198. Welded atop each member 196 are the transfer arm assemblies 200 which extend outwardly to receive the blocks W. Each arm assembly 200 has an inner portion 201 which functions as an input lever arm and an outer portion 202 which functions as a lever arm. Portions 201 and 202 are separated by a plate 203 welded to portion 201 and having tapped holes therein which receive bolts 204 extending through plate 205 which supports the outer arm portion 202. In this manner the vertical position of the outer portions 202 of arms 200 can be adjusted with respect to the position of the inner portions by moving bolts 204 into different tapped holes in plate 203. This adjustment gives the transfer mechanism B the adaptability for use with a very wide range of size of articles. A gusset plate 206 lends support to this structure. As will hereinafter be evident, arms 200 pivot on a fulcrum pin 208 located near the outer end of arm portions 201 and which receives a sleeve 209 welded to arm portion. Fulcrum pin 208 also extends through bushings 211 which are fixed to the base portion 188 of plates 186 as well as to plates 210.

The outer ends of arm portions 202 are bored to receive block gripping bars 213 which are slotted as at 212 and held thereto by bolts 214. As shown in FIG. 6, the tip portions 215 of bars 213 engage the outer edge of a block W. Fine adjustment of the gripping pressure can, of course, be accomplished by moving slotted bars 213.

Similarly, the bottom and inner side of each block is gripped by assemblies 216 which consist generally of angles 218, one leg of which is adapted to extend under the block, and the other leg of which is fixed to plates 210. Side plates 219 are movable toward and away from blocks W via the adjusting bolts 220 which are locked in place by nuts 221.

In operation of the transfer mechanism B, with the arms in the chain line position of FIG. 16, the cylinder 163 rotates the assembly until in a position as shown in FIG. 6 for an arm 200 to pick up a pair of blocks from table frame 144 of feeder A, and for the opposite arm 200 to pick up a finished pair of blocks from a pallet 11. When in this position, the cylinder 191 is actuated upwardly causing the arms 200 to swing to the full line position of FIG. 16 by the movement of pins 199 in slots 198 as shown in the full line position of FIG. 16. With all proper adjustments being made, the blocks will be engaged by tips 215 of bars 213 and by the angles 218 and plates 219. Such a condition is shown in phantom in FIG. 11. At this time, the actuation of cylinder 169, moving the rod 173 to the right in FIG. 18, causes the arms 175 to move from the chain line position in FIG. 18 to the full line position slightly raising the entire assembly. Reverse actuation of cylinder 163 moving the rod 162 to the right in FIG. 18, then rotates the transfer mechanism B 90° to carry one pair of blocks to the system S and to remove another pair of blocks from the system S to the conventional take-away conveyor T. Cylinder 169 then reverses (to the left in FIG. 18) lowering the blocks, and cylinder 191 thereafter moves rod 192 downward in FIG. 18, unclamping the blocks by pivoting arms 200 back to the FIG. 16 chain line position. At this time the drive mechanism 10 begins to index the pallets 11 thereby moving the pair of blocks W from the angle 218. Immediately thereafter, cylinder 169 raises the mechanism B so that the moving pallets 11 will not interfere with the frame 186. At this time cylinder 163 is actuated to again rotate mechanism B 90°. After the pallet 11 has cleared the frame 186, cylinder 169 lowers transfer mechanism B into a position to receive another pair of blocks from feeder A and a pair of finished blocks from another pallet 11. This process is continually repeated in a timed relation with the pallet drive mechanism 10.

After a pair of blocks has been positioned on pallet 11 by the transfer mechanism B, the drive mechanism 10 indexes transferring the blocks to the centering station C shown generally in FIG. 1 and in detail in FIGS. 21-24, inclusive. The mechanism of station C is carried by a frame 150 which extends along both sides of system S (FIG. 1) and carries most of the mechanisms of the system. Frame 150, and thus most of the members of the system, are vertically movable, by an apparatus to be hereinafter described and designated by the reference numerals 230–252, inclusive, in FIG. 20 so as to accommodate varying sizes of blocks or workpieces and so as to provide overall system adjustability.

Figure 21:
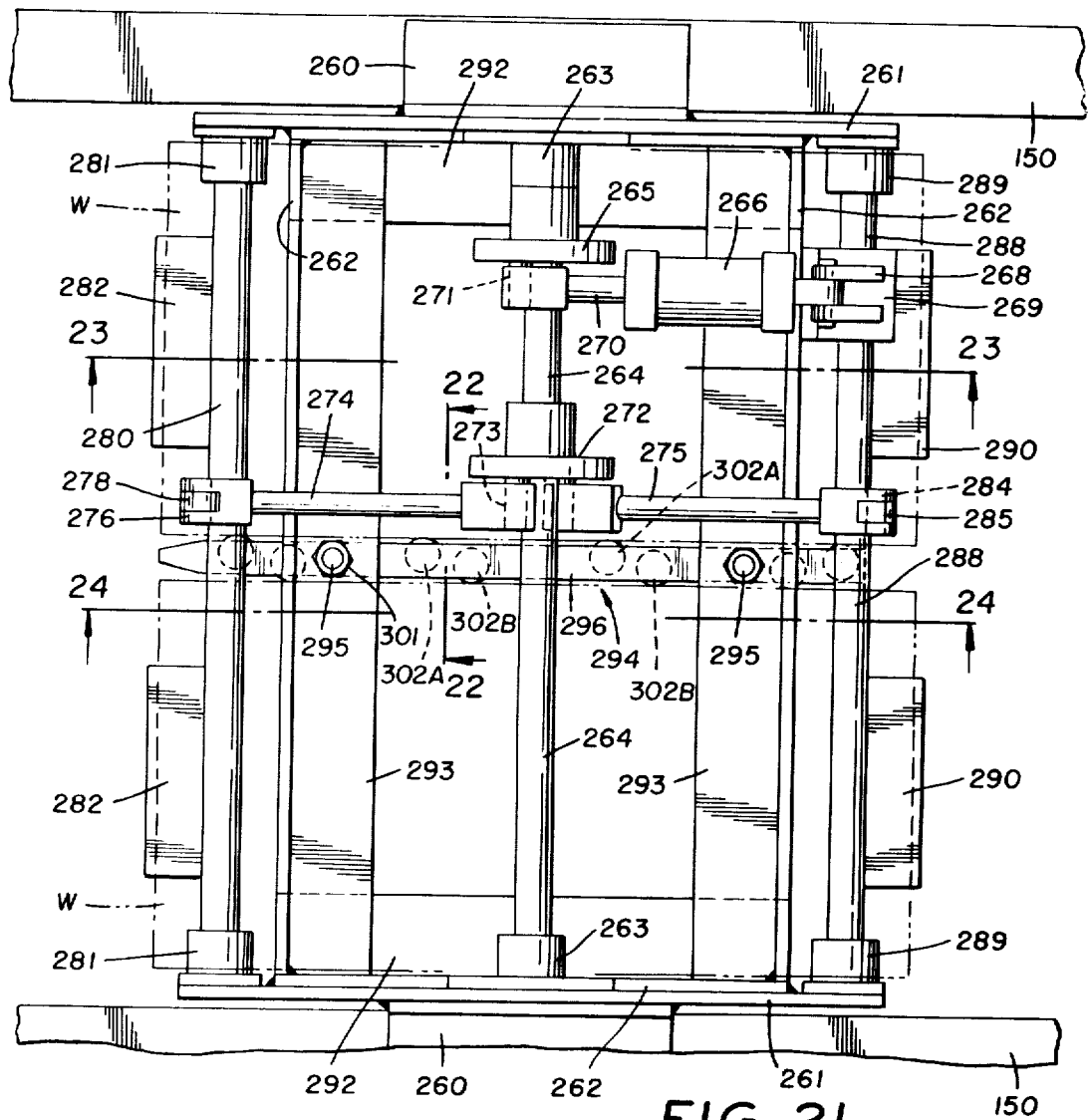
FIG. 21 is an enlarged top plan view of the article centering device constituting one station of the overall system.
Figure 22:
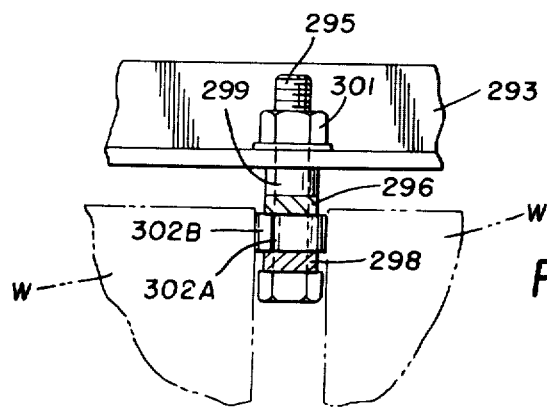
FIG. 22 is a sectional view taken substantially along line 22—22 of FIG. 21.
Figure 23:
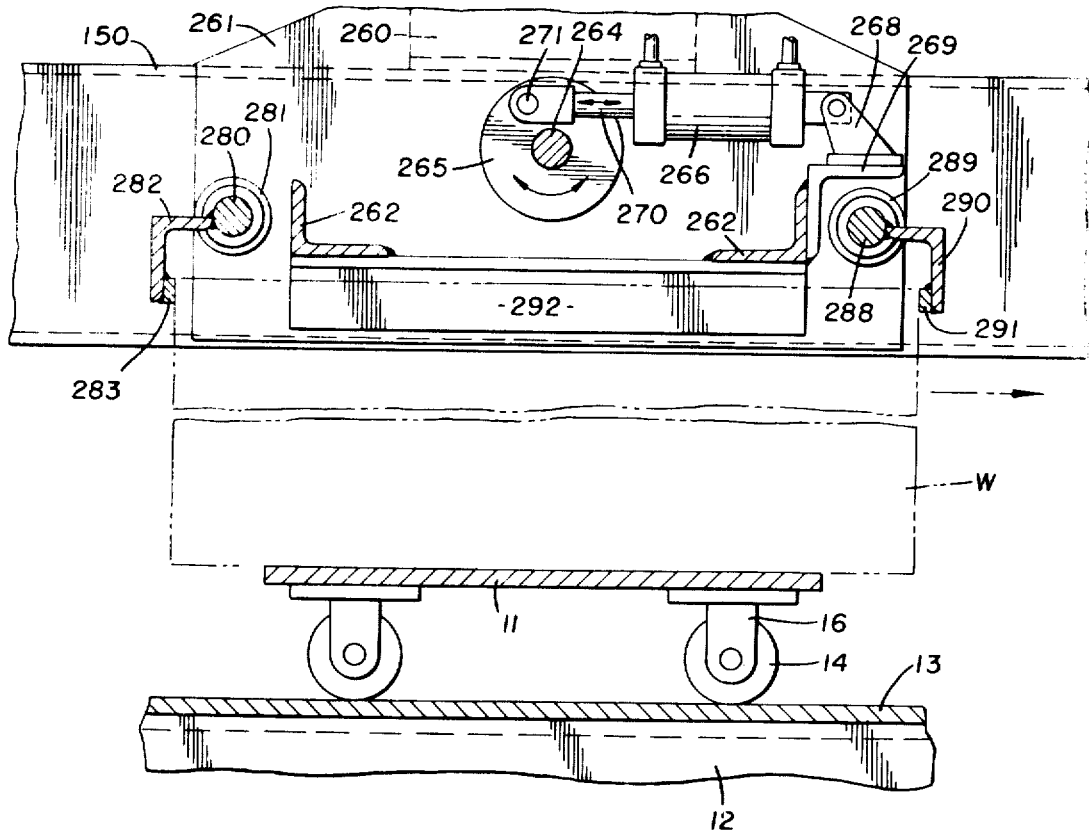
FIG. 23 is a sectional view taken substantially along line 23—23 of FIG. 21.
Figure 24:
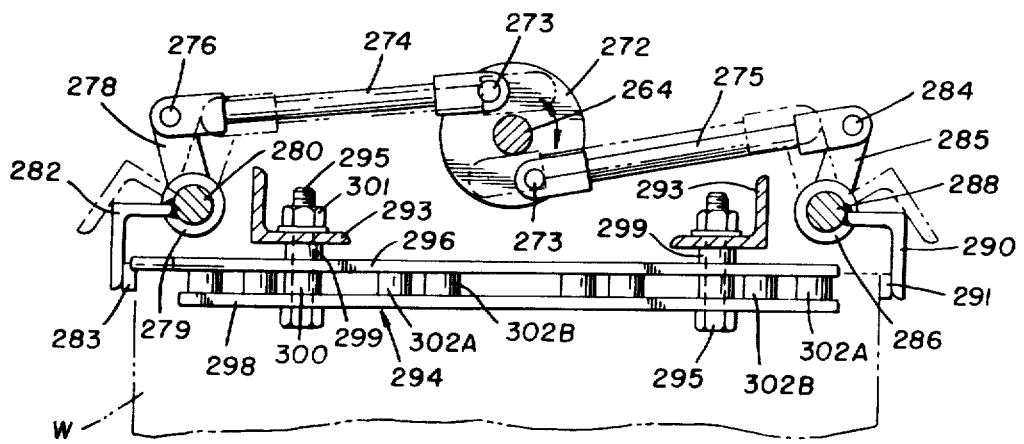
FIG. 24 is a sectional view taken substantially along line 24—24 of FIG. 21.

Frame 150, through angles 260, support journal plates 261 which support, among other items, a rectangular box frame 262 (FIG. 21). Journaled in bushings 263 is a power shaft 264 which carries a drive plate 265. A power cylinder 266 is mounted on a clevis support 268 fixed to angle 269 welded to box frame 262. The piston rod 270 of cylinder 266 is pin mounted, as at 271, to drive plate 265. A plate 272, similar to plate 265, is keyed to shaft 264 and is pin connected, as at 273, to two drive rods 274 and 275 thereby forming a pitman-like connection.

Drive rod 274 is pin and clevis connected at 276 to throw arm 278 which rotates through collar 279, a shaft 280. Shaft 280 is journaled in bushings 281 fixed to plates 261 and carries centering angles or paddles 282, one branch of which have wear bars or contact plates 283 which, as will hereinafter be evident, serve to center blocks W on the pallet 11 in the longitudinal direction, that is, the direction of travel of the blocks through the system S.

Drive rod 275 is pin and clevis connected at 284 to throw arm 285 which rotates, through collar 286, a shaft 288. Shaft 288 is journaled in bushings 289 fixed to plates 261 and carries centering angles or paddles 290, one branch of which have wear bars or contact plates 291 which cooperate with paddles 282 and plates 283 to longitudinally center the blocks. Thus, if for some reason, the pairing portion 81 of block feeder A or the transfer mechanism B has not properly longitudinally located the blocks W on the pallet 11, when arriving at station C, cylinder 266 will be actuated to rotate plates 282 and 290 from the chain line position of FIG. 24 to the solid line position therein to precisely center the blocks longitudinally for further operation within the system S.

While the blocks should also have been properly laterally spaced by bar 124' of feeder A, the centering mechanism C also operates to assure precise lateral positioning of the blocks on pallets 11. The box structure 262 supports two angles 292 which in turn carry two laterally extending angles 293. The lateral centering structure, indicated generally by the numeral 294, depends from angles 293. Bolts 295 extend through angles 293 and carry an upper plate 296 and lower plate 298. Spacers 299 regulate and maintain the distance between upper plate 296 and angle 293 and additional spacers 300 (FIG. 24) are located between plates 296 and 298. The entire assembly is held in place by nuts 301.

Spacer rollers 302A and 302B are located between plates 296 and 298 and are laterally offset so that each extend outwardly of plates 296 and 298 as shown in FIG. 21. The rollers 302A are fixed such that a tangent drawn thereto is a straight line which thereby defines the lateral position of the block W in the upper portion of FIG. 21. Similarly, rollers 302B regulate the position of the block W in the lower portion of FIG. 21. Therefore, as the blocks pass by rollers 302A and 302B, they are laterally centered.

Figure 20:
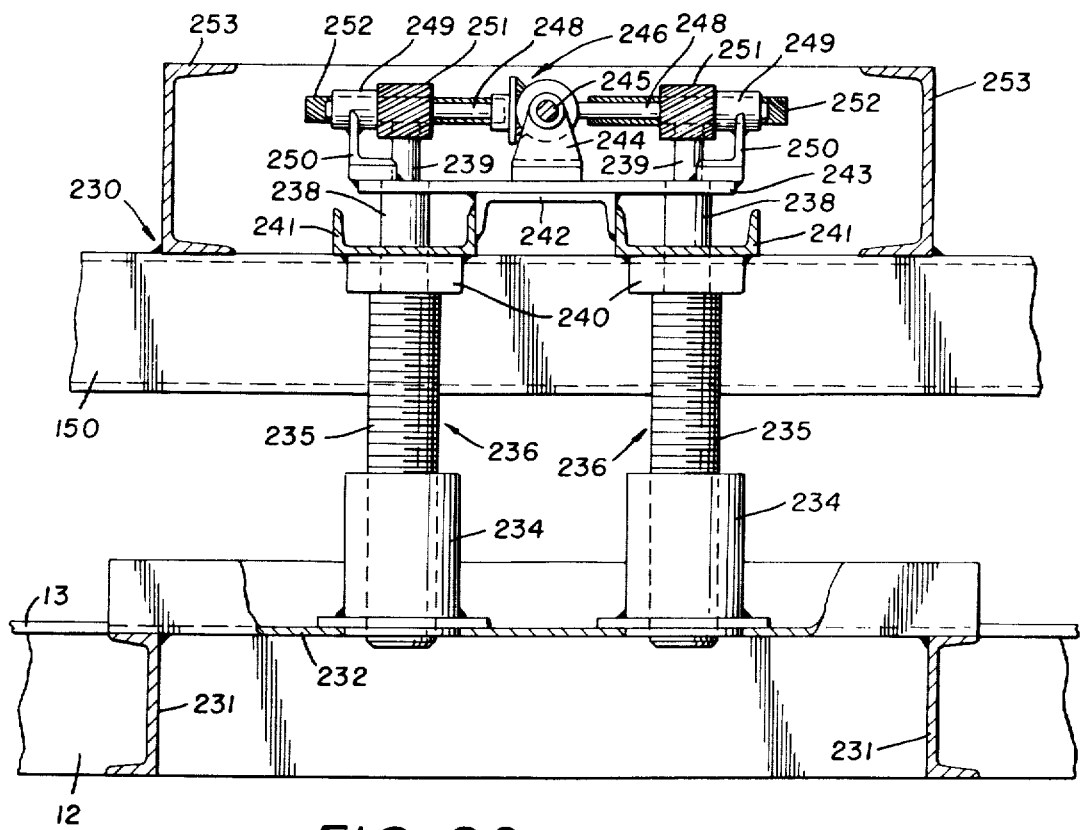
FIG. 20 is a sectional view taken substantially along line 20—20 of FIG. 1 and showing the height adjust- ment means by which the system is adaptable to various sized articles to be decoratively faced as well as adjust- able for various facing thicknesses.

The details of the height adjustment mechanism which raises and lowers frame 150 is indicated generally by the numeral 230 in FIG. 1 and shown in detail in FIG. 20. Cross support members 231 extend between the base frame 12 and carry a load plate 232. Extending upwardly from plate 232 are two threaded collars 234 which receive the threaded portion 235 of support posts 236 therein. Posts 236 each terminate in two reduced diameter non-threaded portions 238 and 239. Received around portion 238 is a collar 240 which is welded to two upper cross-frame support members 241 which span frame 150 and are affixed thereto. A channel 242 extends between support members 241 and holds a plate 243 thereon. Plate 243 carries a clevis bracket 244 which supports a crankshaft 245 that turns a bevel gear arrangement 246. The bevel gear turns a shaft 248 which is supported at each end by bushings 249 mounted on angles 250 carried by plate 243. The rotation of shaft 248 turns worm gears 251 which mesh with and thereby rotate the large bull gears 252. Further upper cross channels 253 extend between frame 150.

The bull gears 252 are fixed to upper portions 239 of posts 236 to rotate the same. The turning of shaft 245, either by hand or with a power source not shown, turns the posts 235 through gears 246, 251 and 252. The rotation of posts 235 moves frame 150 with respect to the fixed lower frames, such as 12, thereby rendering the height adjustability feature to the system S.

With the blocks being longitudinally and laterally precisely positioned at station C, they may be transferred to the mold receiving station D. The manner in which a mold filled with curable material at station D is shown in FIGS. 25-34, inclusive. FIG. 25 schematically depicts the overall operation and position of station D which generally extends laterally across the entire system S. A large swingable arm 310 carries a mold control mechanism 311 at its outer end. The mold control mechanism 311 holds a mold assembly which includes a mold carrying plate 312 that carries two molds 313 for the two blocks W on a pallet. Arm 310 swings across the machine to the chain line position of FIG. 25 and thereafter the molds 313 are lowered and pressed into registry with the blocks W. The details of this apparatus are shown in FIGS. 26-34, inclusive.

Figure 26:
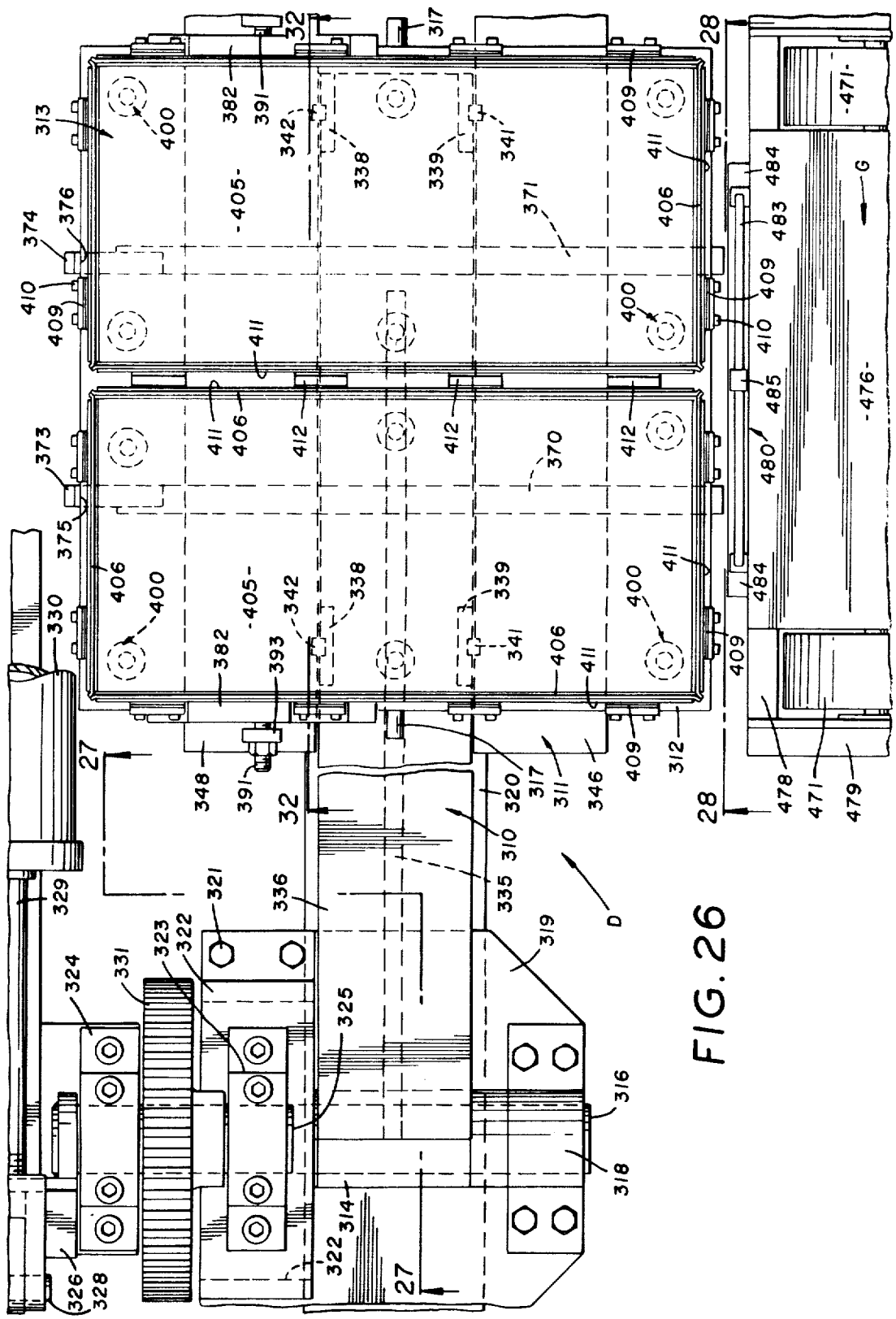
FIG. 26 is an enlarged partial top plan view of the de- vice shown in FIG. 25.
Figures 27, 31:
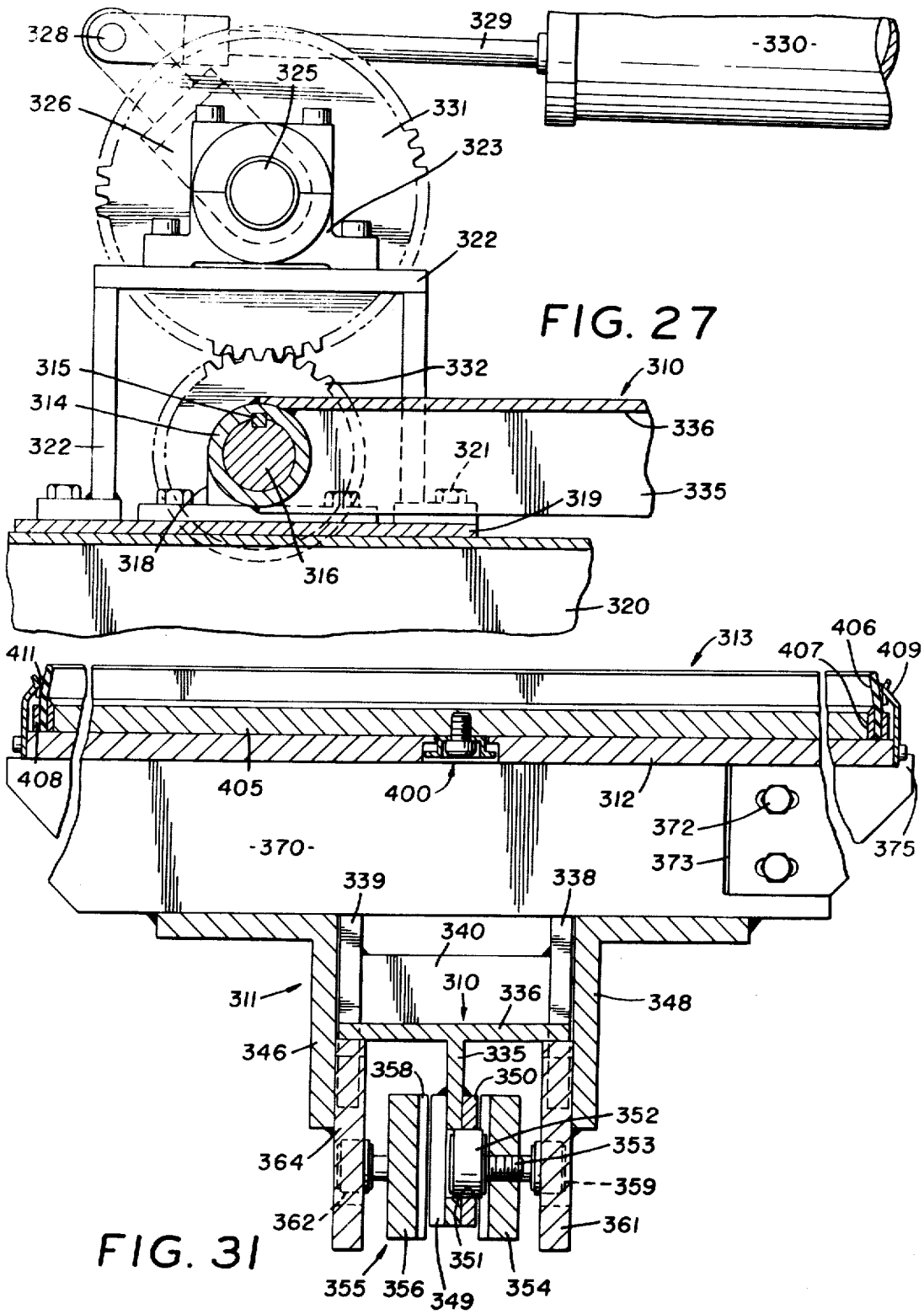
FIG. 27 is a sectional view taken substantially along line 27—27 of FIG. 26.
FIG. 31 is a sectional view taken substantially along line 31—31 of FIG. 28 and is found on the sheet of drawings with FIG. 27.

The manner in which the arm 310 swings through an arc of 180° is best shown in FIGS. 26 and 27. Arm 310 is welded to a bushing 314 which is keyed at 315 to a shaft 316. A pair of laterally spaced bearing collars 318 are mounted on plate 319 which is fixed to an angle 320 which is an extension of the adjustable frame 150. Also mounted on plate 319, as by bolts 321, is a platform 322 which carries bearing collars 323 and 324 for a shaft 325. A clevis assembly 326 is welded to the end of shaft 325 and is pinned, as at 328, to a piston rod 329 of a large power cylinder 330.

The timed stroking of the rod 329 of cylinder 330 rotates stub shaft 325 which has a gear 331 affixed thereto. Gear 331 meshes with gear 332 mounted on shaft 316 thereby rotating shaft 316 and arm 310, as well as the mold control mechanism 311 and members attached thereto. The interconnection between arm 310 and these members will now be described in detail.

As best shown in FIGS. 31 and 33, the arm 310 is preferably T-shaped in cross-section having a web portion 335 and a top flange or shelf portion 336. Welded to the edges of shelf 336 are two key support plates 338 and 339 with a gusset plate 340 providing reinforcement therebetween. Key support plates 338 and 339 carry guide keys 341 and 342, respectively, affixed thereto as by machine screws 343. Keys 341 and 342 ride in key slots 344 and 345, respectively, in mold control plates or angles 346 and 348, respectively, thus rendering mold control plates 346 and 348 movable with respect to arm 310 along the axis of the guide keys 341 and 342.

Figures 28, 29:
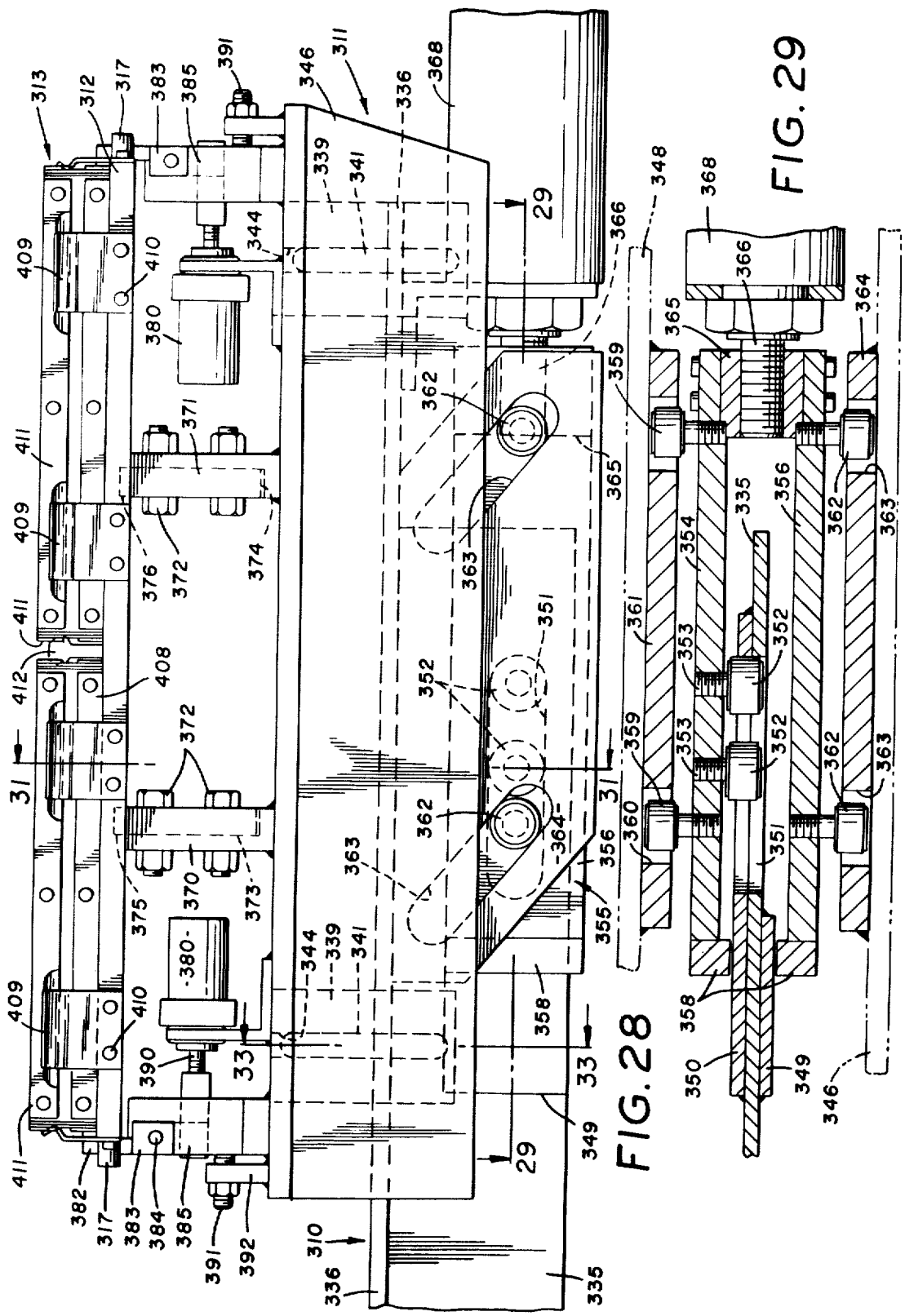
FIG. 28 is a side view taken substantially along line 28—28 of FIG. 26.
FIG. 29 is a sectional view taken substantially along line 29—29 of FIG. 28.

As best shown in FIGS. 28 and 29, the web portion 335 of arm 310 does not extend inwardly under mold control portion 311 of station D to the extent of the shelf portion 336, and near its inner end has reinforcing plates 349 and 350 welded thereto. Web 335 and plate 350 include a generally horizontal drive slot 351 which carry drive rollers 352 therein. Rollers 352 are supported on axles 353 which are threaded into a side frame or guide plate 354 of a box frame indicated generally by the numeral 355 and having a second side frame 356, one end or base portion 358 and a second end or block portion 365. The base portion 358 is slotted to allow the passage of web 335 and support plates 349 and 350 therethrough.

Branch 354 carries cam follower rollers 359 which ride in inclined cam slots 360 in a cam plate 361 welded to mold control plate 348. Similarly, branch 356 carries cam follower rollers 362 which ride in inclined cam slots 363 in a cam plate 364 welded to mold control plate 346. The block end portion 365 of box frame 355 receives a piston rod 366 of power cylinder 368.

The stroking of rod 366 by power cylinder 368 causes the cam followers 362 to ride in the inclined cam slots 363 from the FIG. 28 position to the FIG. 30 position thereby controlling the vertical position of the elements carried thereby, particularly the plates or angles 346 and 348. As will hereinafter be evident, such motion raises and lowers the mold support plate 312 with respect to the arm 310.

Extending laterally across and spanning the distance between plates 346 and 348 are mold support bars 370 and 371, best shown in FIGS. 26, 28 and 32. Bolted, as at 372, to one end of each bar 370 and 371, are adjustable stop bars 373 and 374, respectively, the tops of which extend upwardly above bars 370 and 371 to present stop lugs 375 and 376, respectively. In a manner to be hereinafter described, the mold support plate 312 carrying filled molds 313 is transferred from mold filling station G and moved longitudinally along the top of bars 370 and 371 until stops 375 and 376 are contacted.

Contact with stops 375 and 376 actuates (through an electrical control not shown) the mold clamping and centering cylinders 380 supported on brackets 381 welded to plates 346 and 348. As best shown in FIGS. 32 and 34, lock bars 382 have depending leg portions 383 which are pinned, as at 384, on supports 385 welded to plate 348. Centrally located pivot bars 386 depend from each bar 382 and carry, in a slot 388 therein, a pin 389 carried by an extension of the piston rod 390 of cylinder 380. An adjustable set screw 391 mounted in bracket 393 which is welded to plate 348 defines the limits of the locking movement of bars 382. Thus, upon activation of cylinder 380, lock bars 382 swing from the chain line position in FIG. 32 to the solid line position therein to clamp plate 312 so that plate 312 will be centered on and will move with plates 346 and 348 and the associated members. Thereafter, upon actuation of power cylinder 330, the arm 310, control mechanism 311, mold plate 312 and molds 313 will swing over, as shown in FIG. 25, to a position above the blocks W.

While the mold assemblies including molds 313 and mold plates 312 are shown, for example, in FIGS. 31 and 32, in conjunction with the mold receiving station D components, the actual details of the molds are best shown in FIGS. 35–40, inclusive. As shown overall in FIG. 26, each mold plate 312 is capable of carrying two molds 313 and includes an ear-like projection 317 located at each side thereof. As will hereinafter become evident, projections 317 are utilized to remove the molds from the blocks at station F.

Figure 38:
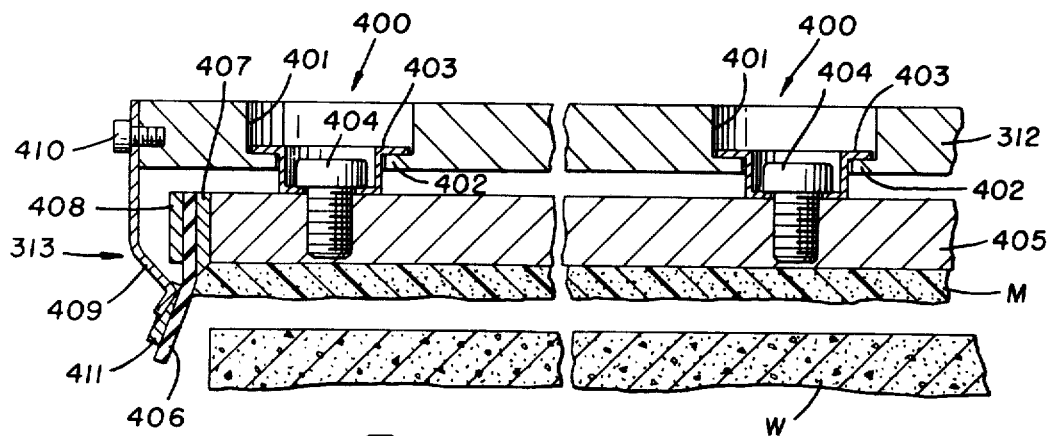
FIG. 38 is a sectional view of the mold and mold locking mechanism.
Figure 39:
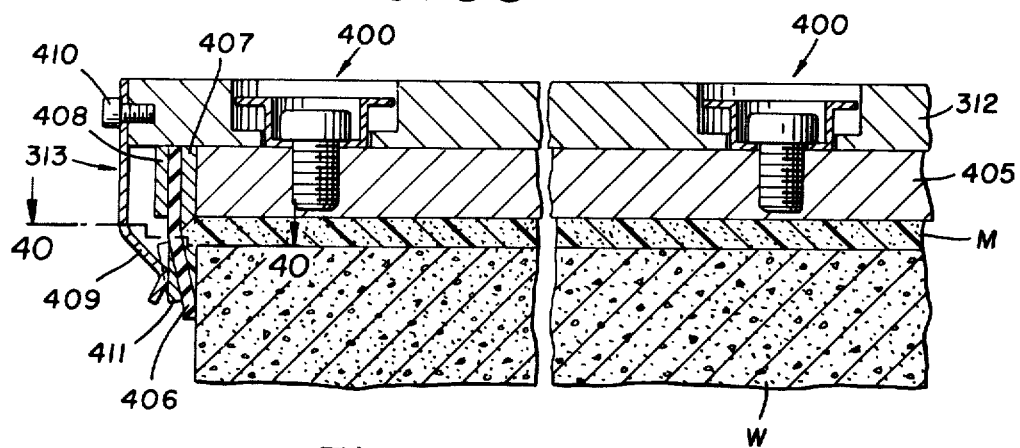
FIG. 39 is a sectional view sequentially following FIG. 38 in the mold locking method.

The mold carrying plate 312 is shown as having twelve bores 400, which, as shown in FIGS. 38 and 39 (the mold being in an inverted position herein), extend entirely through plate 312 and are counterbored, as at 401, to form shoulders 402 to receive inserts 403. Each insert 403 has an aperture therein which receives a bolt 404 to connect the plate 312 with the bottom plate 405 of molds 313.

The curable material M is placed on bottom plate or base 405 and laterally confined therein by the mold sides which consist of strips of flexible material 406, such as rubber or the like, affixed between a shaping strip 407 and anchor plate 408. As will hereinafter become evident, the shape of strip 407 dictates the configuration of the corner of the material on the block and can be changed to suit the particular kind of shape desired. A series of spring clips 409 are bolted, as at 410, to plate 312 and extend generally downwardly and inwardly to contact a metallic stripping 411 on the flexible material 406. As shown in FIGS. 35–37, inclusive, between each mold cavity, a double clip 412 extends from plate 312 to bias the stripping 411 inwardly at that location of the molds.

Prior to the movement of the cylinder 330, the mold plate 405 is resting on mold carrying plate 312 which in turn is on arm 310. As the arm 310 swings into position over the blocks W by actuation of cylinder 330, the bottom plate 405 of molds 313 becomes spaced, by gravity, from mold support plate 312 as shown in FIGS. 35 and 38. The flexible side materials 406 are also permitted to expand outwardly (FIG. 30) so that they will be able to thereafter engage the sides of the blocks W. Because the material M is quite viscous in its uncured form, as will hereinafter be described, it adheres to the mold surfaces and is not affected by gravity.

At this time operation of cylinder 368 moves through control assembly 311, both plate 312 and molds 313 to a position shown in FIg. 36 where the material M has contacted the blocks W and plates 405 of mold assembly 313 have ceased moving. At this time, however, plates 312 and 405 remain spaced. Continued movement of cylinder 368 causes the cam followers 359 and 362 to ride in inclined cam slots 360 and 363 to move plate 312 with respect to plate 405 to the FIG. 37 or 39 position. This movement causes inserts 403 to move within bores 400 and also causes the clips 409 and 411 to move downward to displace the flexible mold side wall material 406 inwardly against the side of the block thereby locking the mold assembly securely in place on the blocks and also providing smooth corners for the curable material M. This action can also move the blocks if for some reason they were not properly centered at station C or if the arm 310 is not precisely in position with respect to the blocks W.

Figure 40:
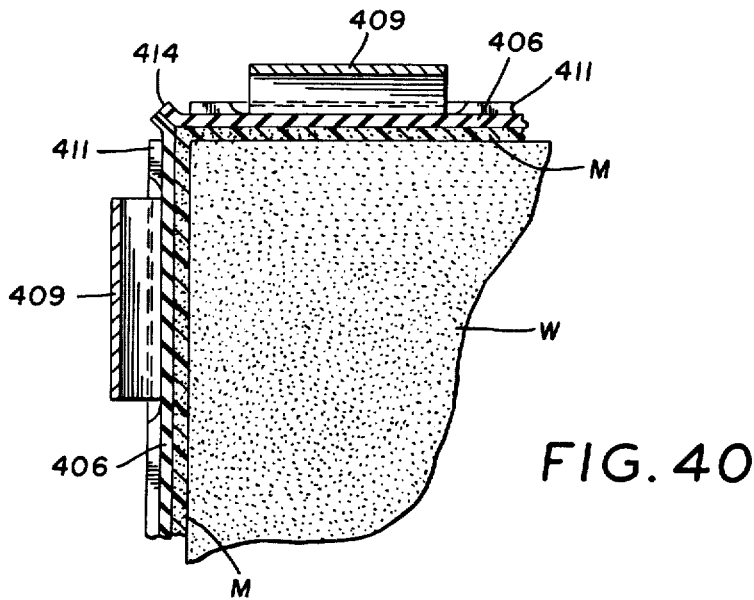
FIG. 40 is a sectional view taken substantially along line 40—40 of FIG. 39.
Figure 43:
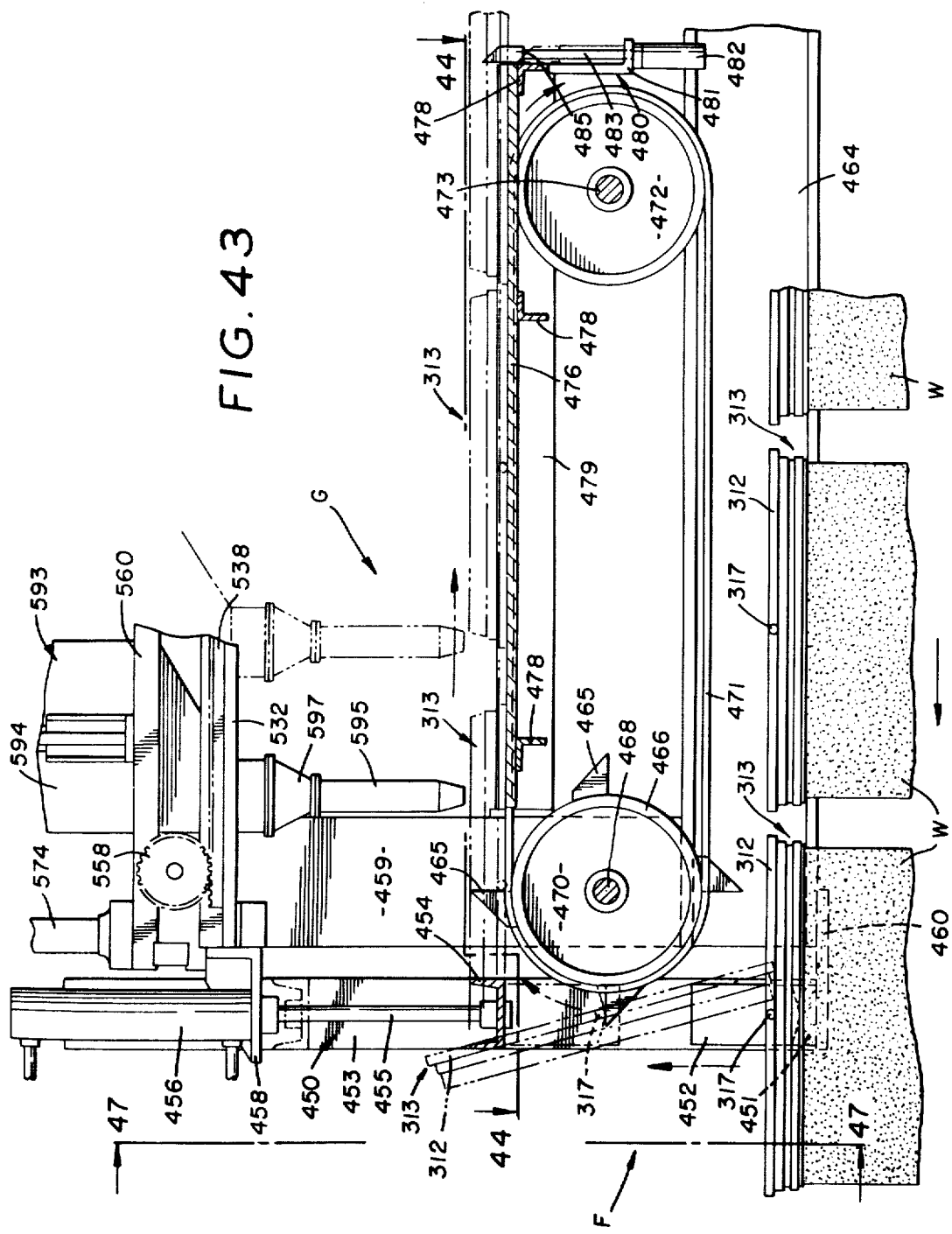
FIG. 43 is an elevational view of the mold removing and filling stations taken substantially along line 43—43 of FIG. 1.
Figure 44:
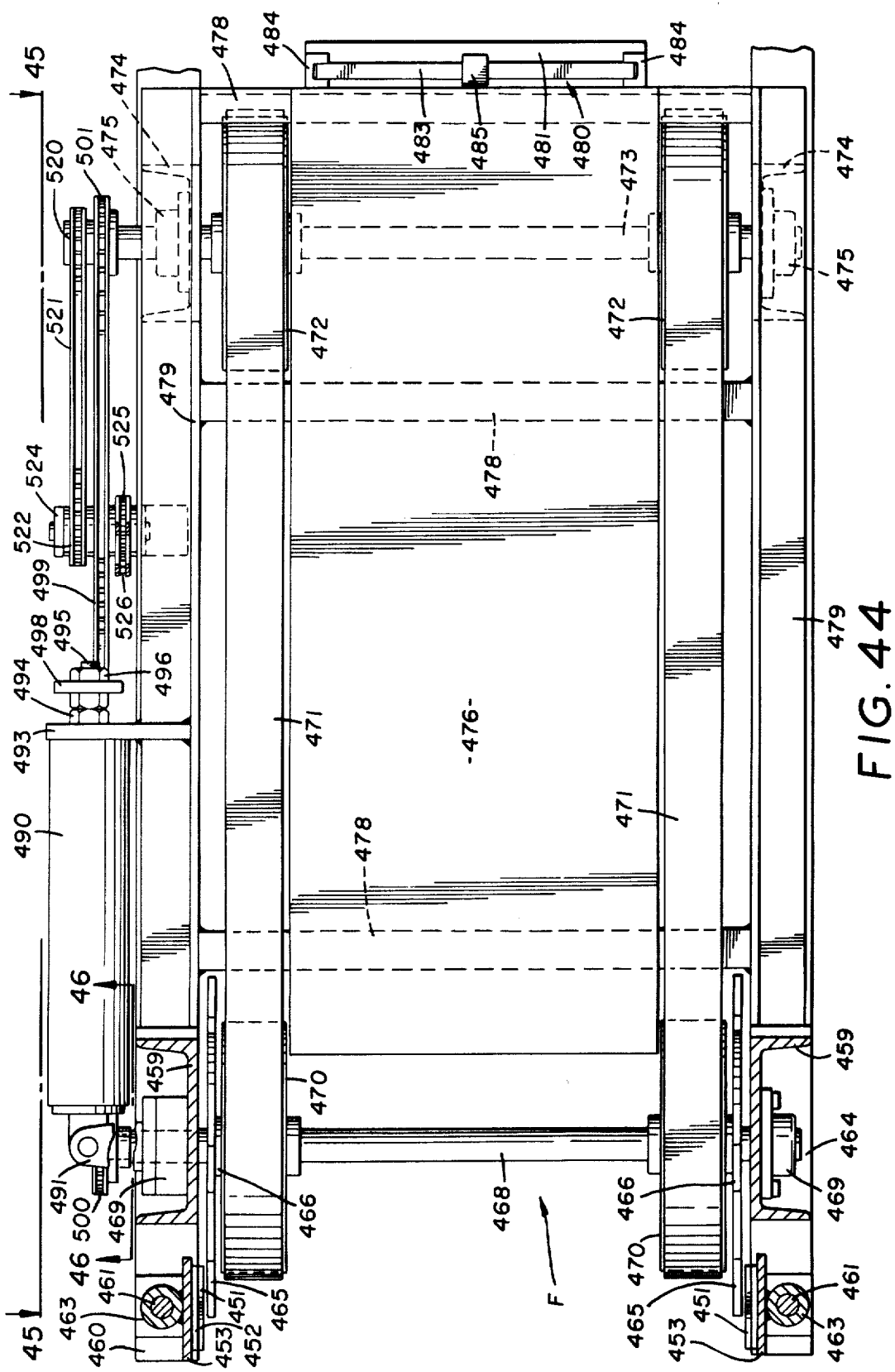
FIG. 44 is a partially sectioned top plan view taken substantially along line 44—44 of FIG. 43.

Further, as shown in FIG. 40, the side wall materials 406 can be constructed to overlap, as at 414, so that even corners of the facing material M are formed. The thickness of the material M on a block W is controlled by the amount of material placed in a mold, to be hereinafter described, and in conjunction therewith, is controlled by the original position of the assemblies of station D due to its mounting on adjustable plate 150 and by the squeezing action of the cylinder 368. Thus, by adjusting the squeezing stroke of mold control assembly 311, the exact predetermined material thickness is controlled and positively confined.

With the molds thus locked on blocks W, the cylinders 380 are actuated to unlatch plate 312 from control assembly 311 and the molds 313 and plate 312 remain locked on the blocks as they continue to the next operating station. The power cylinder 330 is then actuated to swing arm 310 back to receive two more molds which are on another plate 312 and which are filled with the material M.

The material M itself can be one of a number of coating compounds. Preferably, the coating is a polymeric compound which when cured on an article, such as the blocks W, provides the article with a generally aesthetic appearance. One general class of polymeric compounds is polyester resin of which there are many types and which generally possess and exhibit excellent hardness abrasion resistance, wear resistance and stain-resistant features, and accordingly are well suited for use as protective finishes for indoor and outdoor exposure. Such resinous compositions are, moreover, excellent binders and molding materials. Another advantage of these polyester resins is that they can be mixed with decorative materials such as sand, silica, oyster shells, chipped granite, chipped marble, stone flour and glass as well as various conventional dyes to give a beautifully presentable textured finish. For purposes of safety, a fire retardant can also easily be added to the resin.

In accordance with concepts well known to those skilled in the art, the reaction between difunctional alcohols and acids produce linear polyester polymers. If the polymer contains unsaturated portions as when an unsaturated alcohol or acid is used, an unsaturated monomer such as styrene may be introduced to react with the unsaturated portions which results in the cross-linking of the polyester to form a complex three dimensional polyester resin. Usually unsaturated linear polyesters containing an unsaturated monomer are pre-made and sold on the market in a syrup form which contains an inhibitor such as hydroquinone to prevent premature cross-linking. In normal use, a peroxide catalyst or activator such as MEK (methyl ethyl ketone) is added to the syrup to overcome the inhibitor, resulting in a cross-linked polyester resin having the above-noted properties. As apparent to one skilled in the art, many different types of difunctional acids or alcohols as well as monomers, inhibitors and catalysts are available to produce a wide range of tailor-made polyester resins.

The application of a decorative polyester resin material M to a block W should thus be apparent. The selected decorative material is added in an amount to the pre-made polyester syrup to form a plastic mix in accordance with a final decorative material concentration. The activator is then added to the plastic mix and the entire mixture is blended and applied to the blocks. Preferably, the blocks are at a temperature below the decomposition temperature of the peroxide activator to permit part of the blended polyester mixture to flow into the cracks, crevices and surface depressions of the block and arrange itself into a smooth surface coating. Such penetration of the material will reinforce and strengthen the blocks once the material is cured. The blocks are then heated in a manner to be hereinafter described, to a temperature above the decomposition temperature of the peroxide activator in order to cross-link or cure the decorative coating. A specific pre-cure and cure temperature of a particular MEK peroxide is 120°F. and 180°F., respectively, but since commercial formulations of MEK peroxide activators are generally mixtures of several peroxides, the pre-cure temperatures of several commercial formulations will vary.

In the system S described herein, the material M is metered into the molds 313 at filling station G, the details of which will be hereinafter described. Because the mold assemblies are recycled at station F, to be hereinafter described, they are still warm (at least 100°F.) when they receive the material M and a pre-curing begins at that time. This pre-cure continues during the station D operations just described until the blocks W having the molds thereon move from station D to oven station E, shown overall in FIG. 1, and shown in detail in FIGS. 41 and 42.

Oven station E is shown in FIG. 1 as having six heating zones $E_1$, $E_2$, $E_3$, $E_4$, $E_5$, and $E_6$. Zone $E_1$ encompasses one stop position of the pallets 11, while the other heating zones each include two stop positions. Between zone $E_3$ and $E_4$ is a neutral zone $E_n$ which also has two stop locations.

Figure 42:
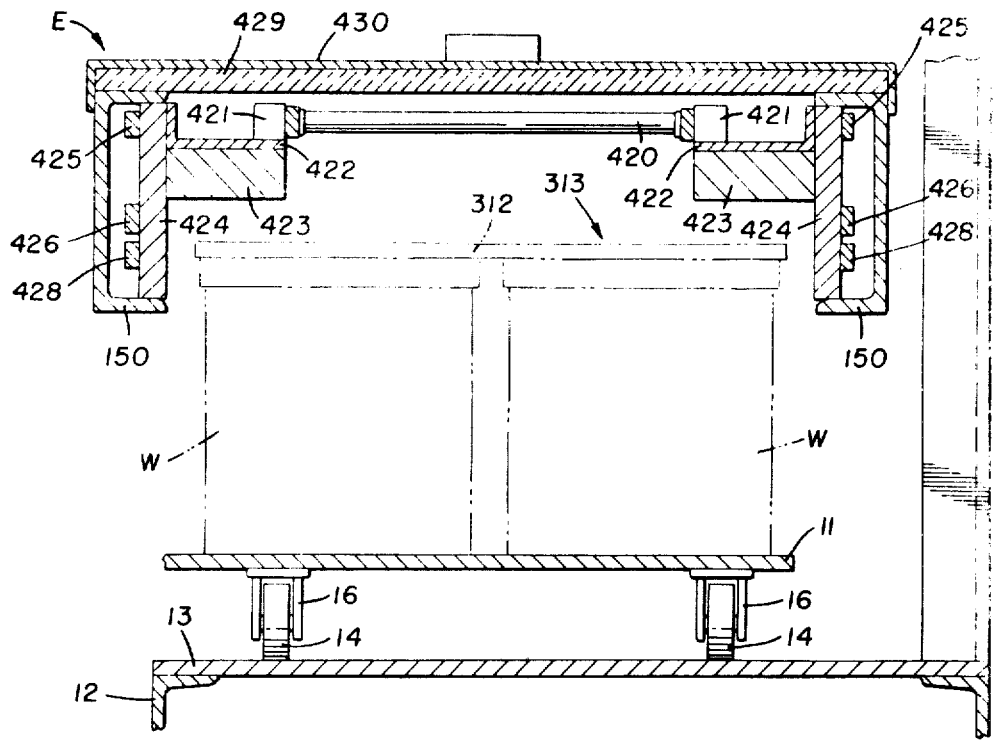
FIG. 42 is a sectional view taken substantially along line 42—42 of FIG. 41, and is found on the sheet of drawings with FIG. 15.
Figure 15:
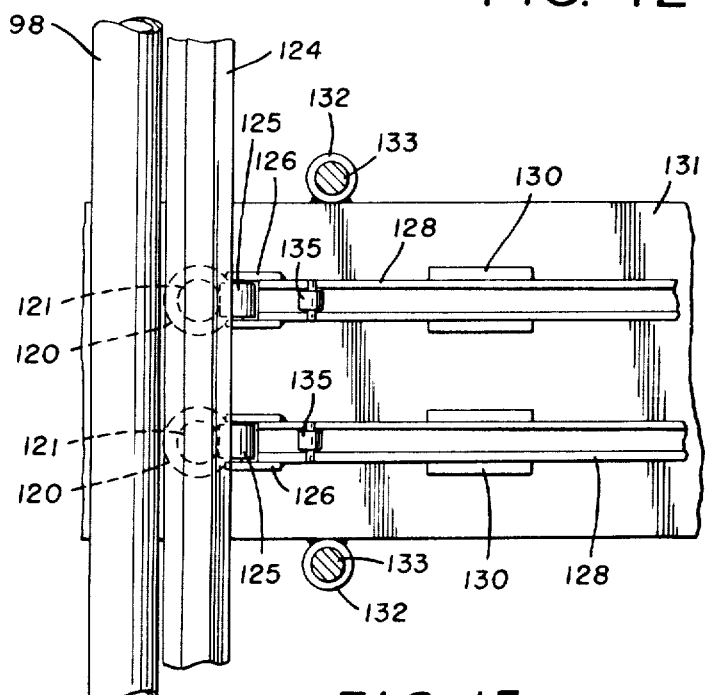
FIG. 15 is a sectional view taken substantially along line 15—15 of FIG. 13.
Figure 41:
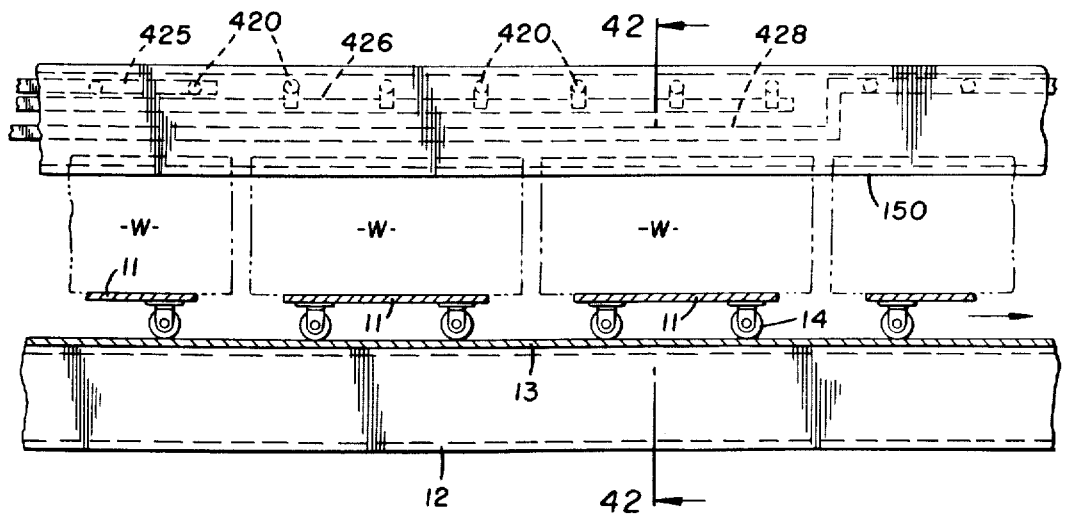
FIG. 41 is a sectional view taken substantially along line 41—41 of FIG. 1 and showing the movable pallets in the oven and heat zone station, this Fig. being found on the sheet of drawings with FIG. 20.

The apparatus of each of the heating zones $E_1$-$E_6$, inclusive, is substantially identical and is best shown in FIGS. 41 and 42. A plurality of heating elements 420, which can be infrared quartz tubes or the like, are removably mounted in sockets 421 and extend generally over the blocks W as they intermittently pass thereunder. The sockets 421 are held by electrical brackets 422 which are mounted on insulation blocks 423. Insulated bus bar supporting blocks 424 each carry three bus bars 425, 426 and 428. Each bus bar carries current from a conventional delta connected three phase power source. All the heating elements 420 within a particular zone are electrically connected, through brackets 422, to one set of bus bars, that is either bus bars 425, 426 or 428. Thus, for example, bus bars 425 may control the heating elements in zone $E_1$, bus bars 426 may control the heating elements in zone $E_2$, and bus bars 428 may control the heating elements in zone $E_3$. Heating within zones $E_4$, $E_5$ and $E_6$ are similarly controlled by three more identical bus bars on the other side of the machine.

The entire heating assembly just described is carried by the adjustable frame 150 thus providing the capability to the heating system of maintaining the same distance between the heating elements 420 and the blocks and mold combination, regardless of the size of the blocks or other material. The entire oven station E is enclosed by a cover assembly which includes an insulation plate 429 and a cover plate 430 mounted on frame 150.

The temperature in each zone is controlled by bi-metal thermostats (not shown) which contact the mold to determine its temperature. If the mold is not at the preset temperature for the particular zone, the heating elements 420 are activated. On the other hand, if the temperature of the mold remains above the desired temperature, it is possible that the blocks could travel through an entire zone without requiring further heating.

The exact amount and duration of heat could, of course, vary widely depending upon the precise polymeric compound being utilized, all of which would be well known to one of ordinary skill in the art. When a polyester resin with an MEK activator is used, for example, the following heating sequence has been found successful.

As described above, the material M begins to cure or is at least pre-heated immediately upon being placed in the molds at filling station G. If the material has the previously described aggregate therein, this precure is highly advantageous because the aggregate will begin to settle toward the bottom of the mold and begin to harden at that location. When the mold is subsequently turned over and placed on the blocks, this aggregate, which provides the decorative appearance, will appear on the top of the block adding to the aesthetic appearance thereof. As the molds move through station G, onto arms 310, then onto the block W, and finally into zone $E_1$, the drive mechanism 10 has indexed five times. If, for example, the indexing period is timed to occur every thirty seconds, at least two and one-half minutes of precure has taken place.

In order to initiate the MEK activator to begin to cross-link the polyester resin, the temperatures in zone $E_1$–$E_5$, inclusive, can be set at about the same temperature, usually about 120°F. Between zone $E_3$ and zone $E_4$, at the end of the system S, is the neutral zone $E_n$ where in the preferred embodiment, no additional heat as been added. Usually, by the time the molds have indexed five times through zones $E_1$, $E_2$ and $E_3$ at 120°F., they will retain the desired temperature without further heat (other than the ambient oven heat which would, of course, always be present) until zone $E_4$ is reached. By the time the blocks have moved through zone $E_5$, they have received enough 120°F. heat to assure that the molecular structure is now set for the final cure. This initial cure, including the precure, should not take longer than eight minutes. Thus, since 16 stops of the drive mechanism 10 are shown from the time of mold filling all the way through heating zone $E_5$, the thirty second interval was arrived at.

After the initial cure, there is, of course, a heat of reaction produced internally within the material itself which, with the higher temperatures of oven zone $E_6$, causes a very fast or accelerated rate of cure to bring about the solid final state of the polyester resin. Usually the temperature in zone $E_6$ is high enough to maintain the molds at at least 180°F. and often higher. The upper limit of this final cure cycle (which can be about 250°F.) is dictated by the precise characteristics of the particular material used. Care must be taken not to scorch or craze the now hardened facing material. It should be evident that the six zone system herein affords a great deal of flexibility in that if necessary, each one could be maintained at its own temperature to perfect the cure desired.

When the blocks leave zone $E_6$, they enter a post-cure cycle which simply means that as the heated mold assemblies and blocks retain their heat, the material M goes through a tapering post-curing stage to assure a perfect product. This post-cure stage continues primarily until the molds are removed from the blocks; however, because the blocks themselves are still hot and due to the heat of reaction of the chemicals, post-cure will even continue until the blocks cool to room temperature.

After the blocks W have emerged from the oven station E, with the material M now substantially cured hereon, they enter the mold removal station F which accomplishes the general functions of unlocking the molds from the blocks, removing the molds from the blocks and transferring the empty molds to the mold filling station G. The apparatus of station F is best shown in FIGS. 43-48, inclusive.

Figure 45:
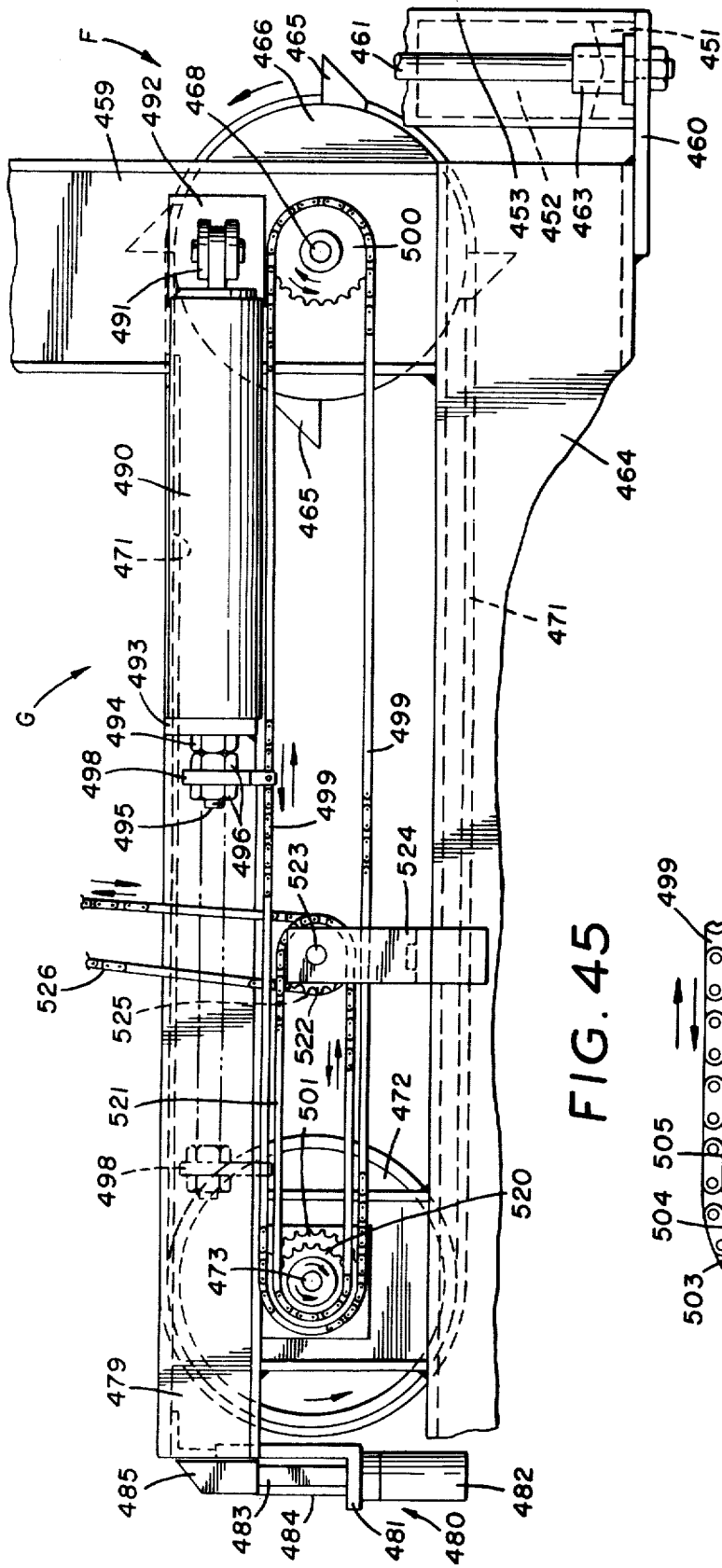
FIG. 45 is a side elevational view taken substantially along line 45—45 of FIG. 44.
Figure 47:
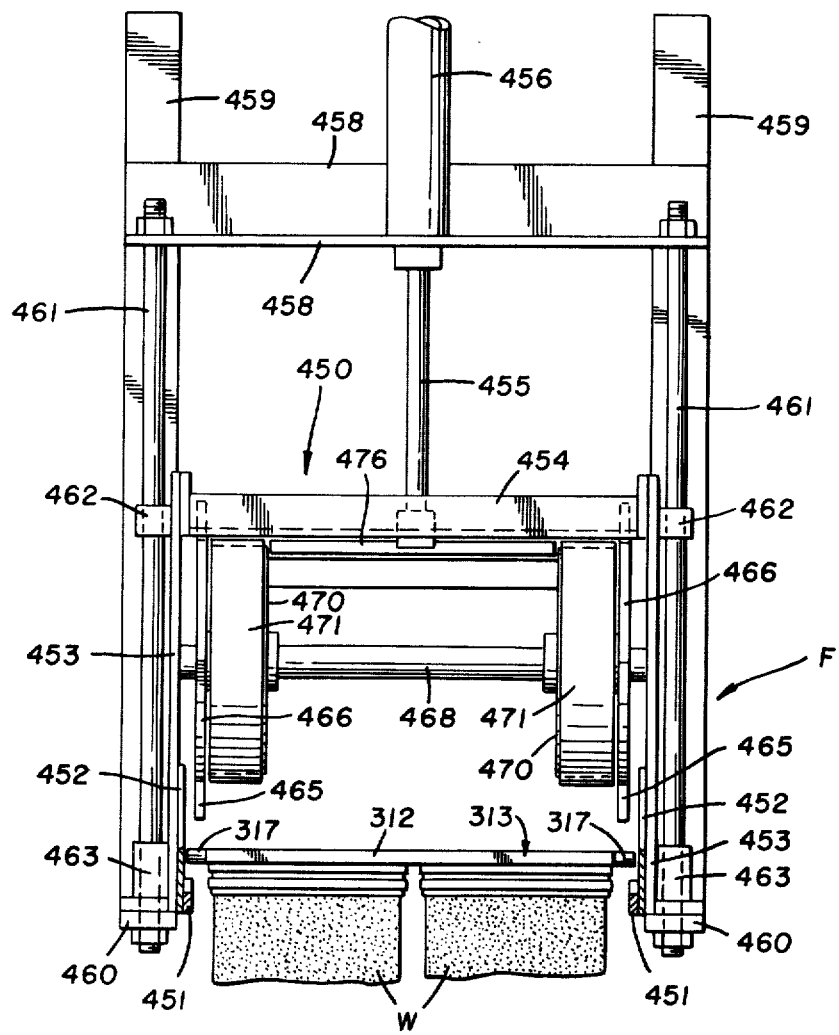
FIG. 47 is an end elevational view taken substantially along line 47—47 of FIG. 43.

One of the prime components of station F is an elevator system indicated generally by the numeral 450 in FIG. 47. Two V-shaped pick-up plates 451 are fastened to shim plates 452 which are in turn fixed to slide plates 453. Plates 453 are joined by cross member 454 which has affixed thereto the piston rod 455 of a power cylinder 456. A support angle 458 spans two upright stanchions 459 and carries cylinder 456. Extending between and fixed to angle 458 and two support plates 460 are two guide rods 461. Bushings 462 and 463 are slidable on guide rods 461 and are fixed to slide plates 453. Plates 460 are supported by lower frame member 464 (FIG. 45). Activation of cylinder 456 thus raises plates 453, guided by rods 461, and thereby lifts all members attached thereto, such as pick-up plates 451.

Figure 48:
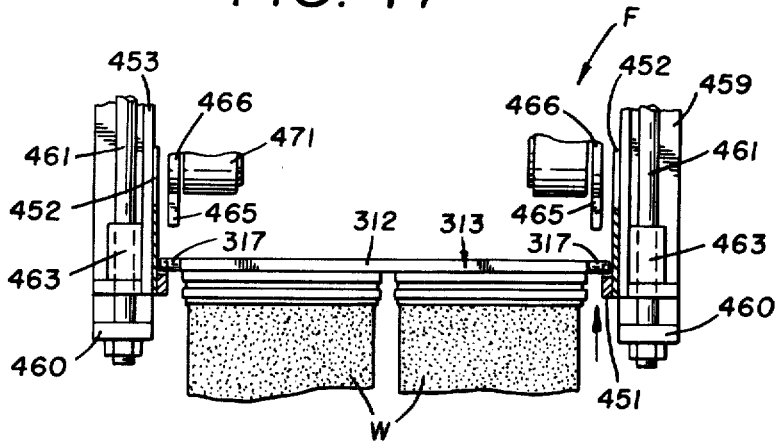
FIG. 48 is a broken away partial view of the apparatus of FIG. 47 sequentially following that shown in FIG. 47.

As shown in FIG. 48, upward movement of the elevator 450 allows plates 451 to engage the ears 317 on mold plate 312 to raise the same. This action unlocks the mold mechanisms by moving plate 312 away from plate 405, as in the FIG. 35 position. It could be the case that a mold might adhere to the cured material and thereby the action of elevator 450 could tend to lift blocks W off the pallets. While this will not usually be the case because the material M will tend to shrink as it cures, one skilled in the art could readily develop means to lock the blocks to the pallets, for example, after the blocks are centered at station C.

The raising of the mold assembly by elevator 450 allows teeth 465 of a plate 466 to engage under ears 317 in a manner now to be described. Plates 466 are rotatably driven by a power shaft 468 journaled in bearings 469 between stanchions 459. Drive pulleys 470 fixed to shaft 468 carry belts 471 which extend to pulleys 472 mounted on a shaft 473 journaled to stanchions 474 as by bearings 475. As shaft 468 rotates, in a manner to be hereinafter described, teeth 465 of plate 466 engage under ears 317 of mold plate 312 from the elevator 450 and raise and rotate plate 312, as shown in the chain line of FIG. 32, until plate 312 is turned over and contacted by belts 471 which then move the plate 312 onto a table 475 which is part of the mold filling station G. Table 476 is supported on angles 478 which extend between upper supports 479. As the plates 312 move onto table 476 for subsequent filling, they are prevented from moving onto mold control plates 346 and 348 of station D (FIG. 26) by a stop bar system indicated generally by the numeral 480.

An angle 481 depending from one of the cross members or angles 478 supports a cylinder 482 which actuates a bar 483 guided in two U-shaped channels 484. Vertically above bar 483 is a stop lug 485 which upon actuation of cylinder 482 is raised above the level of table 475 to prohibit the movement of a plate 312 from station G to station D.

Figure 46:
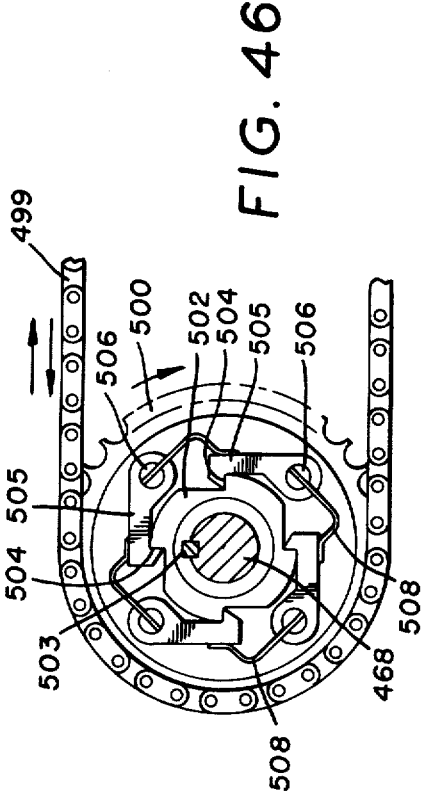
FIG. 46 is a sectional view taken substantially along line 46—46 of FIG. 44.

The manner in which the shafts 468 and 473 are driven is best shown in FIGS. 45 and 46. A power cylinder 490 is mounted at one end by a clevis 491 fixed to a bracket 492 welded to a stanchion 459. A plate 493, welded to supports 479, also supports cylinder 490, being held thereto by nut 494. The threaded piston rod 495 of cylinder 490 is fixed by nuts 496 to a chain connector plate 498. Plate 498 is fixed to a link of drive chain 499 which extends around sprocket 500 on shaft 468 and sprocket 501 on shaft 473. Thus on the stroking of cylinder 490 to the chain line position of FIG. 45 and back to the solid line position, sprocket 501 is caused to oscillate through an arc defined by the stroke of cylinder 490. Sprocket 500, however, as well as shaft 468 and toothed plate 466, do not so oscillate due to the clutch arrangement shown in FIG. 46.

A clutch face plate 502 is keyed, as at 503, to shaft 468 and has ledges 504 which receive clutch ears 505. Pins 506 secure the ears 505 to sprocket 500 and are slotted to hold leaf springs 508 in a position to bias ears 505 inwardly toward ledges 504. On the stroke of cylinder 490 to the left in FIG. 45, chain 499 moves to the right in FIG. 46 turning shaft 468 and the members associated therewith including toothed plate 466. On the return cylinder stroke, to the left in FIG. 46, the clutch face 502 is disengaged by ears 505 and shaft 468 is unaffected. The ears 505 will catch on the next adjacent shoulder or ledge 504 because of the bias of leaf springs 508.

Thus, in summary as to the operation of the mold plate removing and transferring station F, as a pair of blocks W emerge from oven station E, and upon actuation of cylinder 456, the elevator 450 picks up the mold plate 312 by ears 317 to lift it to a position to be further lifted by the toothed plate 466. Through the timed actuation of cylinder 490, plate 466 is advanced sufficiently to place mold plate 312 on table 476 and belts 471 and 476 after turning plate 312 180°. The belts 471 and 476 continue moving to precisely position the mold assembly for filling at station F. Because of the clutch arrangement of FIG. 46, however, the belts 471 and plate 466 are not returned to their original position upon the reversal of cylinder 490. As will hereinafter become evident, on the next stroking of cylinder 490, the mold assembly just described as precisely positioned at filling station F, will travel on table 476 to contact stop bar 455 and await further transfer to station D.

Cylinder 490 is also the primary drive component of the apparatus of mold filling station G, the details of which are best shown in FIGS. 49–54, inclusive. First referring to FIG. 45, however, it can be seen that oscillating shaft 473 carries a sprocket 520 to reciprocate a chain 521. Reciprocating chain 521 oscillates a sprocket 522 which is mounted on a shaft 523 journaled in a bracket 524 which is fixed to frame member 464. Shaft 523 also carries a second sprocket 525 which reciprocates chain 526 that extends upwardly to drive the filling station G components.

Figure 49:
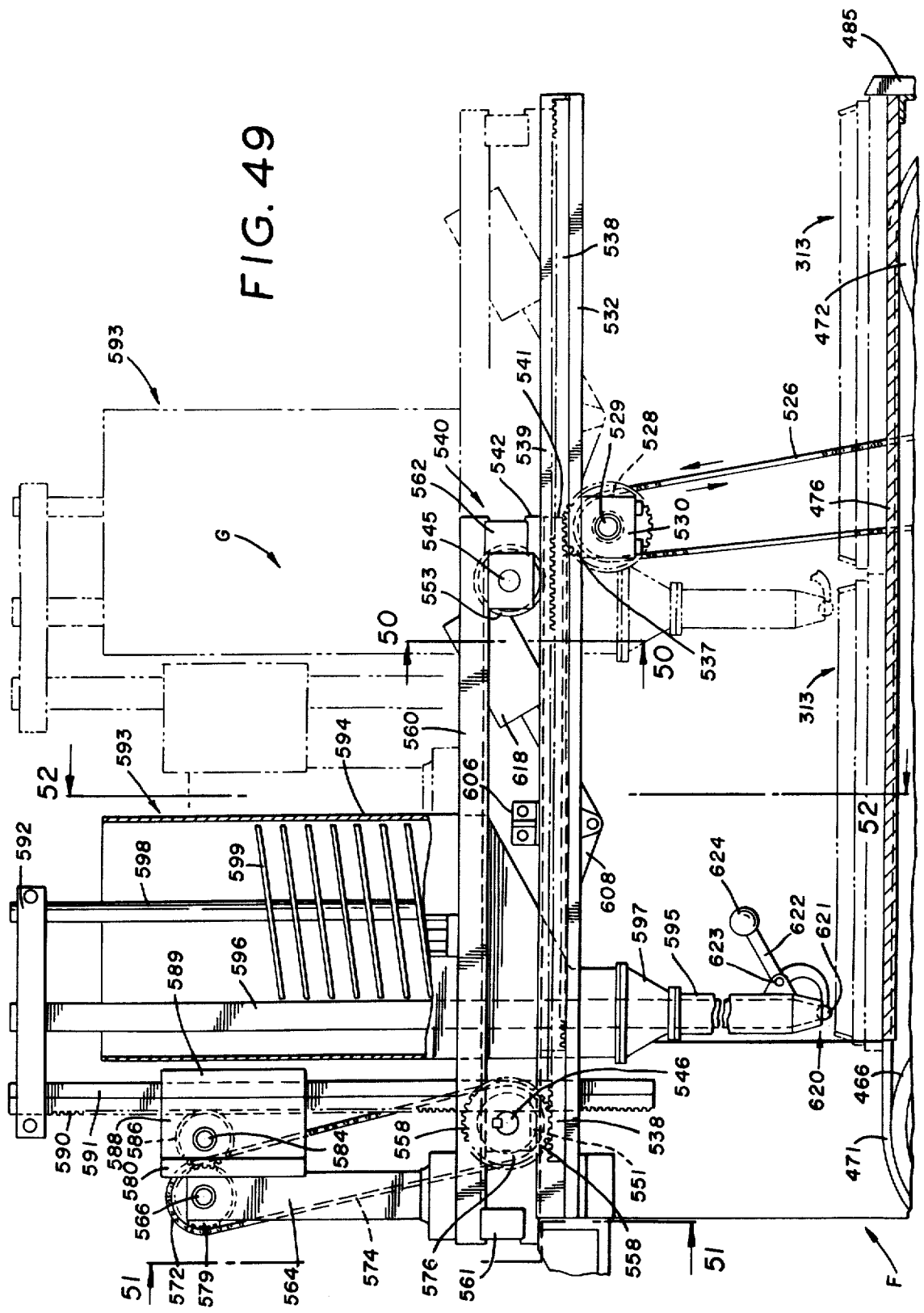
FIG. 49 is an enlarged elevational view of a portion of the apparatus shown in FIG. 43.
Figure 50:
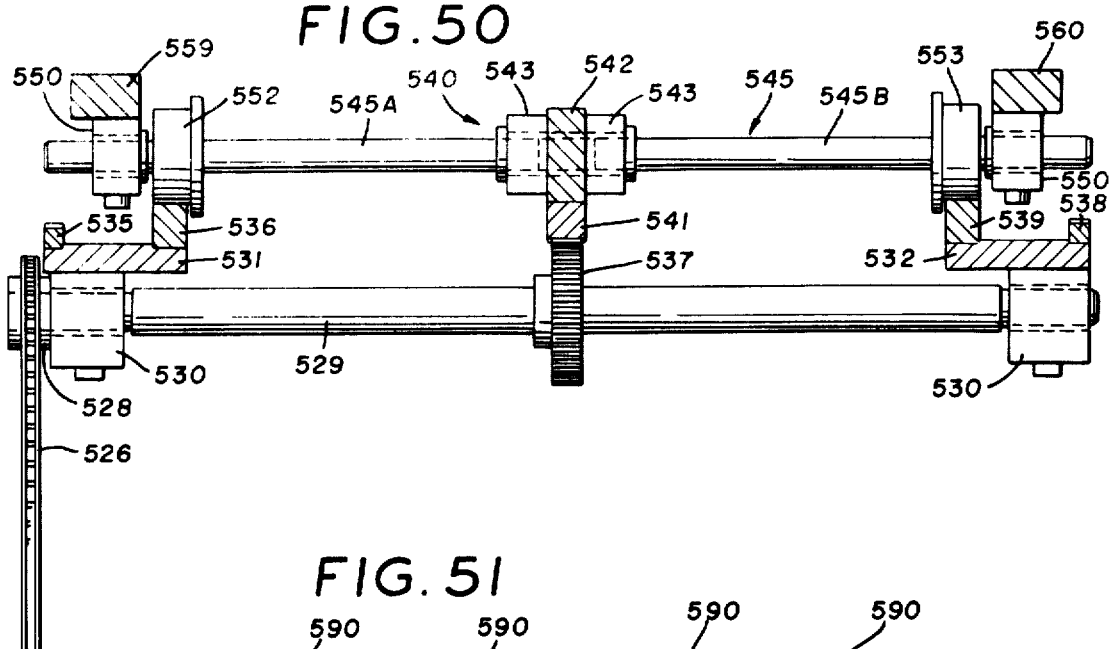
FIG. 50 is a sectional view taken substantially along line 50—50 of FIG. 49.
Figure 51:
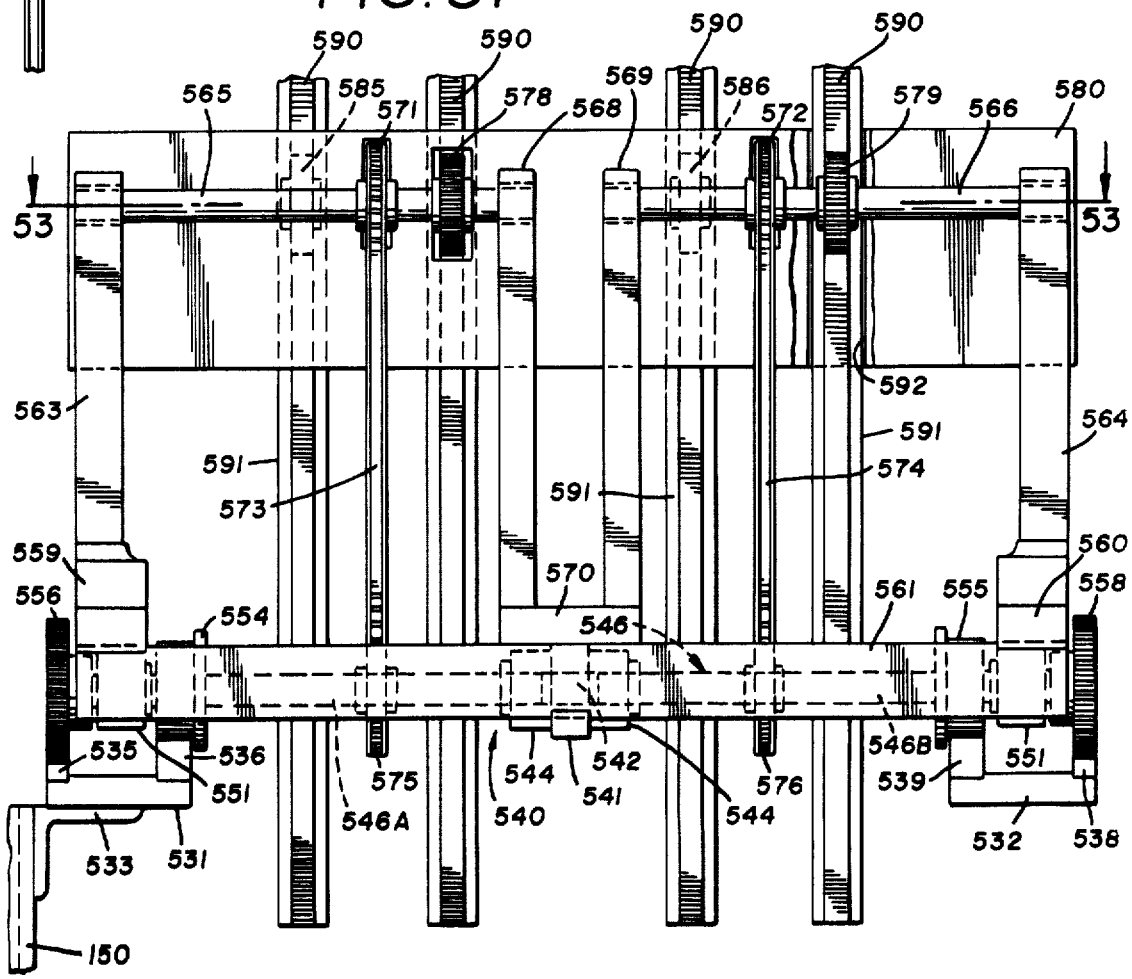
FIG. 51 is an end elevational view taken substantially along line 51—51 of FIG. 49.

As best shown in FIGS. 49 and 50, chain 526 is received by sprocket 528 on shaft 529 journaled in bushings 530. Side track bases 531 and 532 support bushings 530 and are mounted on angle 533 which is fastened to the adjustable frame member 150 (FIG. 51). Track base 531 carries a rack 535 and rail 536, while track 532 similarly carries a rack 538 and rail 539. Keyed to shaft 529 for oscillation therewith is a gear 537 which together with racks 535 and 538 and rails 536 and 539 carries a movable frame or carriage structure indicated generally by the numeral 540.

Carriage 540 is movable longitudinally, that is, in the direction of the movable pallets, by a rack 541 which engages gear 537 so that as gear 537 oscillates, rack 541 reciprocates carriage 540. Rack 541 is supported by bar 542 which has bushings 543 and 544 (FIGS. 50 and 51) affixed thereto. Front and rear shafts generally indicated by the numerals 545 and 546 are divided into shafts 545A, 545B and 546A and 546B, respectively, so that, as will hereinafter become evident, two feeding mechanisms which fill two molds can be independently operated and do not have to be precisely timed to operate together. Shafts 545 and shafts 546 are rotatably received in bushings 543 and 544, respectively, and are supported at their ends by a pair of bushings 550 and 551, respectively. Shafts 545 have wheels 552 and 553 fixed thereto which ride on rails 536 and 539, respectively. Similarly, shafts 546 (FIG. 51) carry wheels 554 and 555 which also ride on rails 536 and 539, respectively. In addition, rear shafts 546 have two gears 556 and 558 fixed thereto which ride on and engage stationary racks 535 and 538, respectively.

Supported by bushings 550 and 551 are longitudinal carriage bars 559 and 560, the ends of which are attached by lateral carriage bars 561 and 562 (FIG. 49).

Thus, bars 559, 560, 561 and 562, along with shafts 545 and 546 and their associated members form the lower portion of carriage 540, all movable longitudinally on racks 535 and 538, gear 537 and rails 536 and 539.

Extending upwardly from approximate one end of bars 559 and 560 are vertical stanchions 563 and 564, respectively, (FIG. 51) in which are journaled one end of shafts 565 and 566, respectively. The other end of shafts 565 and 566 are received in posts 568 and 569, respectively, which extend upwardly from a plate 570 mounted on bar 542. Sprockets 571 and 572 are fixed to shafts 565 and 566, respectively, and carry chains 573 and 574, respectively. Chain 573 is received around a sprocket 575 keyed to shaft 546A and chain 574 is similarly received around a sprocket 576 on shaft 546B. Thus, as shafts 546 rotate due to the interaction of rack 541 and gear 537, shafts 565 and 566 will similarly rotate.

Figure 53:
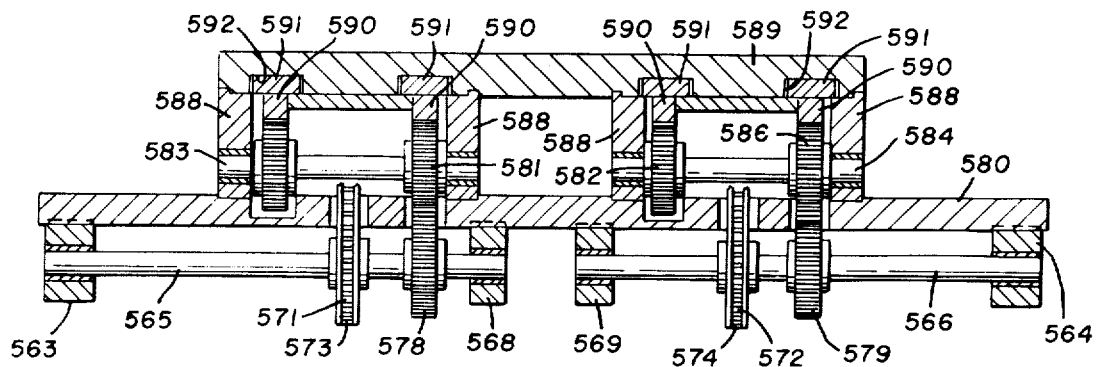
FIG. 53 is a sectional view taken substantially along line 53—53 of FIG. 51.

Gears 578 and 579 are fixed to shafts 565 and 566, respectively, and extend through slots in support plate 580, which is held by stanchions 563 and 564 and posts 568 and 569. Gears 578 and 579 mesh with gears 581 and 582, respectively (FIG. 53). Gears 581 and 582 are fixed to shafts 583 and 584, respectively, which also carry second gears 585 and 586, respectively. Shafts 583 and 584 are journaled between four side plates 588 which extend between support plate 580 and a back plate 589. Taken together, plates 580, 588 and 589 form two gear housings or transmission boxes. Within these boxes, gears 581, 582, 585 and 586 drive two pair or four identical racks 590 which are mounted to slide bars 591 that move vertically within slots 592 in plate 589. Thus, as cylinder 490 strokes, carriage 540 moves longitudinally on gear 537, and on racks 535 and 538 and rails 536 and 539, while at the same time the racks 590 and bars 591 move vertically.

Each pair of racks 590 are fixed to a yoke bar 592 (FIGS. 49 and 52) extending horizontally above two feeding and metering hoppers indicated generally by the numeral 593. Each hopper 593 has a material holding and mixing portion 594, an adapter portion 597 and a metering nozzle portion 595. Each yoke bar 592 carries a plunger unit 596 which vertically moves with racks 590 and plunger 596 extends downwardly into nozzle metering portion 595. Each yoke bar 592 also supports a mixing rod 598 which has sloped flights 599 thereon. Portion 594 of hopper 593 is filled with the curable resin material M. With the plunger 596 moved up and out of metering nozzle 595, a charge of material flows downwardly into metering nozzle 595. Then as the carriage 540 moves from the chain line position in FIG. 49 to the solid line position, the plunger 596 moves downwardly to force a metered amount of material out of the nozzle 595 and into the molds 313. At this same time, the downward movement of sloped flights 599 assure that the curable resin material remains properly mixed.

It must be understood that the downward movement of the plunger 596 is coordinated and timed with the longitudinal movement of the carriage 540 by design of the racks, gears, and sprockets just described. The amount of material M in nozzle portion 595 is controlled by the size of the nozzle because the adapter portion 597 and nozzle 595 are replaceable so that different sized nozzles can be interchanged according to the predetermined thickness of material required on the block. Thus, with the plunger 596 retracted upwardly, the precise amount of material M flows into nozzle 595. Then, as plunger 596 moves down, the nozzle 595 is closed off from the adapter 597 and mixing portion 594 so that no further material can enter the nozzle. Continued downward movement of plunger 596 accurately distributes the material into the molds by opening a stopper assembly indicated generally by the numeral 620 and shown somewhat schematically in FIG. 49.

Stopper assembly 620 consists of a generally tubular plug member 621 adapted to engage and fill the opening in the bottom of nozzle 595. Plug member 621 is held by at least one arm 622 pivotal on a fulcrum pin connection 623 and supported by at least one adjustable counterweight 624 on the outer end of arm 622. In the normal closed position, the counterweight 624 holds the plug 621 against the nozzle opening. As the material flows into the nozzle 595 the weight thereof does not open the plug due to the differential in forces between counterweight 624 and the material M. However, as the plunger 596 forces the material downwardly, the differential of forces is reversed and the stopper assembly 620 opens sufficiently to permit flow of the material out of the nozzle.

Figure 52:
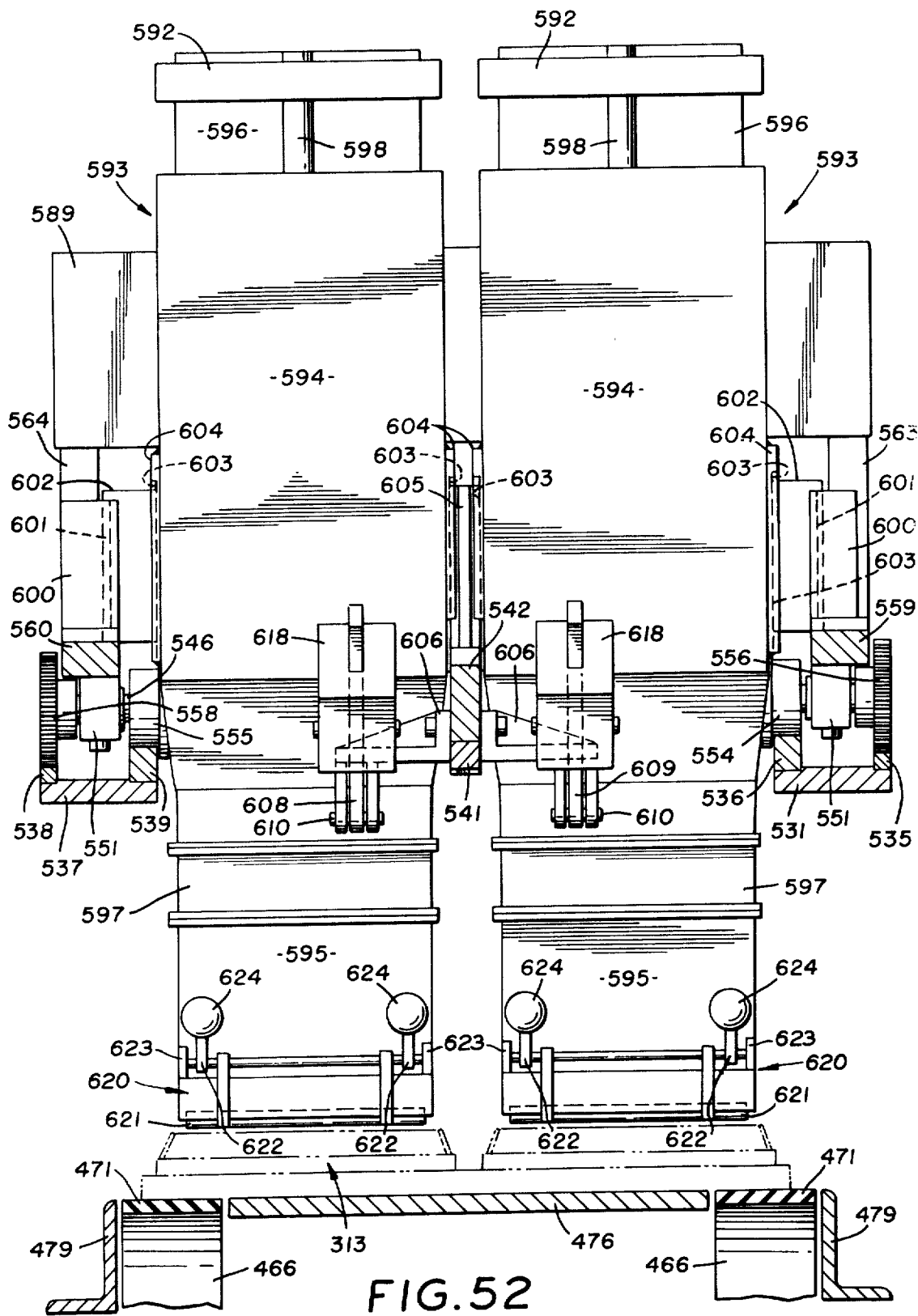
FIG. 52 is a sectional view taken substantially along line 52—52 of FIG. 49.

The manner in which the hoppers 593 are removably mounted is best shown in FIG. 52. Brackets 600 are fixed to carriage bars 559 and 560 and are slotted at 601. Guide bars 602 are fixed within slots 601 and are slidably received in key slots 603 in bars 604 fastened to the outer sides of each hopper 593. Slots 603 terminate a short distance from the top of bars 604 so as to retain the hopper vertically therein. The hoppers are similarly retained by identical bars 604 between each hopper 593 (FIG. 52) with a cross-shaped guide bar 605 supported by bar 542 and received within each slot 603 of bars 604.

Figure 54:
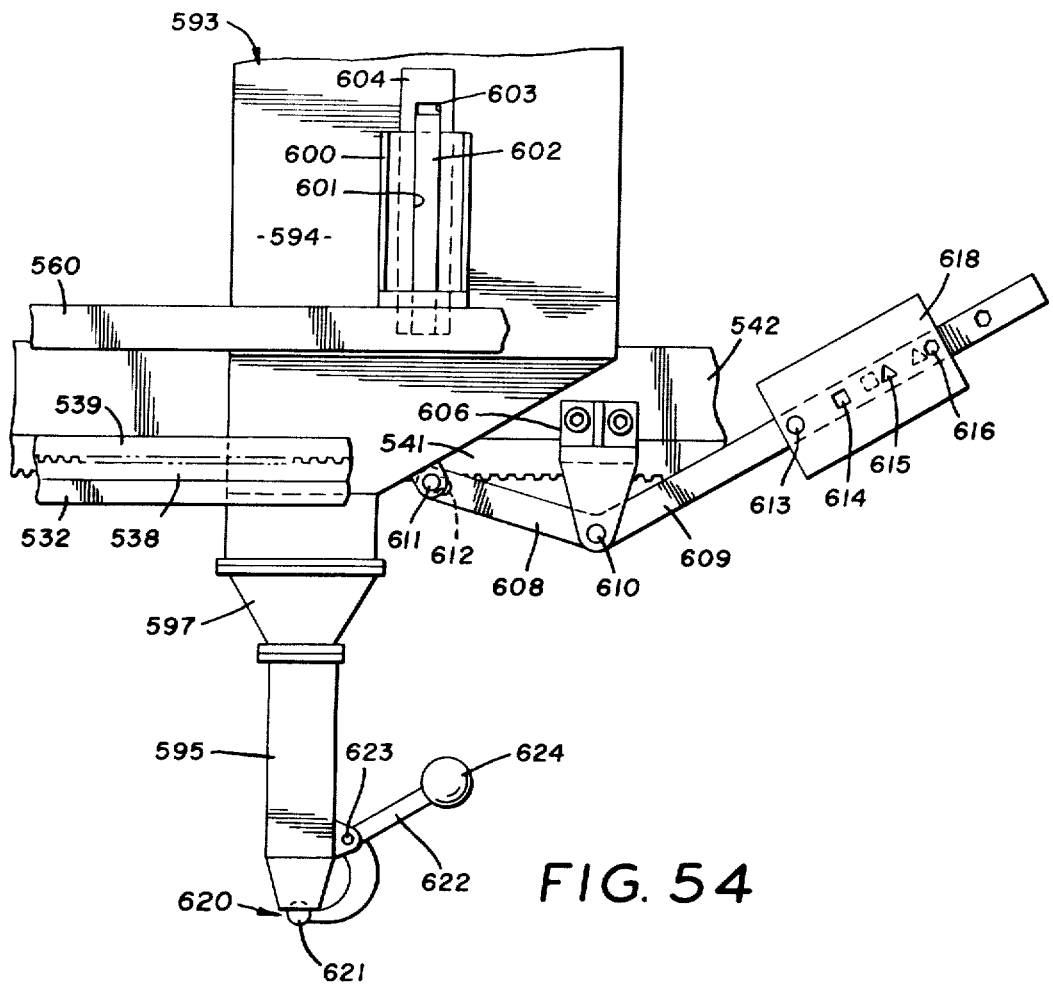
FIG. 54 is a somewhat schematic enlarged view of a portion of the apparatus shown in FIG. 49.

Referring to FIG. 54, a clevis bracket 606 is mounted to bar 542 and carries links 608 and 609, as by pin 610. Link 608 is pinned, as at 611, near the bottom of hopper portion 594 in a tapered slot 612. Link 609 is shown as having a set of geometrically shaped apertures therein: circular aperture 613, square aperture 614, triangular aperture 615 and hexagonal aperture 616 for receiving like pegs of a counterweight 618 in four adjustable positions. Counterweight 618 controls the position of the hopper 593 on the guide bars 602 to control the automatic filling of the hoppers 593, now to be described.

The links 608 and 609 as well as weights 618 can be adjusted for the density and type of material being used to coat the blocks. As the weight of the material in each hopper decreases, the hopper will move upwardly on bars 602 being balanced by the counterweights 618. When the hopper empties to a predetermined amount, link 609 contacts a switch (not shown) which can signal an operator to refill the system or which can activate a conventional automatic filling system.

As the hoppers 593 thus fill the molds 313, the molds are transferred from station G to station D to be thereafter transferred to the blocks W in a manner previously described. In the meantime, the finished blocks, having the molds removed therefrom, are transferred on pallets 11 to a position where they can be picked up by the transfer mechanism B, as described, and placed on the takeaway conveyor T.

The finished block W is shown in FIGS. 55-57, inclusive. It should be noted that any thickness of material M can be placed thereon, as by adjustment of the height of frame 150 or by varying the amount of material applied by hopper 593 or by other means described herein. Whatever thickness, however, because of the configuration of molds 313, previously described, smooth corners of the material M are established on the blocks, the shape of which is dictated by the plate 407 (FIG. 38).

The particular plate 407 shown creates a beveled portion 630 of the facing extending from the top surface to a lip portion 631 which embraces the side walls and end walls of the block W. The bevel portion 630 is shown as being generally perpendicular to a line which bisects the angle of the corner of the block W. The lip 631 adds to the adhesion between the block and the material. While only one surface of the block is shown as having the coating thereon, it is evident that if both the top wall and the bottom wall were to be coated, the blocks would merely have to be reversed and sent through the system S a second time. Additionally, as would be evident to one skilled in the art, the apparatus and mold assemblies described herein could readily be adapted to manufacture corner blocks, that is, blocks having a top or bottom wall coated as well as one end wall.

From the foregoing description, it should be evident that the manufacturing apparatus, system and method described herein, including the apparatus at the various stations of the system, carry out the aforementioned objectives and otherwise improve the article facing and related arts.

What is claimed is:

1. A mold assembly for applying a decorative facing to an article comprising, a mold carrying plate, mold means for receiving material to be applied to the article, means connecting said mold means to said mold carrying plate and allowing movement between said mold means and said mold carrying plate, and means to lock said mold means on the article in response to said mold carrying plate moving toward said mold means.

2. A mold assembly according to claim 1, wherein said mold means includes a base means for receiving the material to be applied to the article and flexible sidewall members to confine the material on said base means, and said means to lock said mold means on the article including means to move said sidewall members in response to the relative movement of said mold means and said mold carrying plate so that said sidewall members grippingly engage the sides of the article, totally enclosing the surface of the article to be decoratively faced and confining the material therein.

3. A mold assembly according to claim 2 wherein said side wall members overlap to form the corners of the facing material on the article and to further confine the material therein.

4. A mold assembly according to claim 1 including means on said mold carrying plate to facilitate removal of the mold assembly from the article.

5. A mold assembly according to claim 1 wherein said means connecting said mold means to said mold carrying plate includes insert means slidably received on counterbored shoulders in apertures in said mold carrying plate, and fastening means attaching said insert means to said mold means so that said insert means can move within the apertures in said mold carrying plate as said mold carrying plate moves with respect to said mold means.

* * * * *